(12) United States Patent
Honjo et al.

(10) Patent No.: US 8,203,628 B2
(45) Date of Patent: Jun. 19, 2012

(54) CAMERA SYSTEM, CAMERA BODY, INTERCHANGEABLE LENS UNIT, AND FOCUS CONTROL METHOD

(75) Inventors: Kenichi Honjo, Osaka (JP); Koji Shibuno, Osaka (JP); Masato Murayama, Osaka (JP)

(73) Assignee: Panasonic Corporation, Osaka (JP)

( * ) Notice: Subject to any disclaimer, the term of this patent is extended or adjusted under 35 U.S.C. 154(b) by 629 days.

(21) Appl. No.: 12/411,491

(22) Filed: Mar. 26, 2009

(65) Prior Publication Data
US 2009/0244325 A1  Oct. 1, 2009

(30) Foreign Application Priority Data
Mar. 27, 2008  (JP) .................. 2008-082792

(51) Int. Cl.
H04N 5/262 (2006.01)
G03B 13/00 (2006.01)
G03B 17/00 (2006.01)
(52) U.S. Cl. ............ 348/240.99; 348/347; 396/82
(58) Field of Classification Search .......... 396/79–82, 396/85, 86; 348/240.99, 347; 359/698
See application file for complete search history.

(56) References Cited

U.S. PATENT DOCUMENTS
4,572,642 A  2/1986 Yamamoto et al.
8,027,581 B2 * 9/2011 Mise et al. ............... 396/81
2005/0046711 A1  3/2005 Morimoto
2005/0104994 A1  5/2005 Morimoto
2010/0254690 A1 * 10/2010 Sasaki ....................... 396/125

FOREIGN PATENT DOCUMENTS
JP  60218613 A  11/1985
JP  4021277 A  1/1992
JP  4042108 A  2/1992
JP  2005077959 A  3/2005
JP  2005148662 A  6/2005

* cited by examiner

*Primary Examiner* — W. B. Perkey
*Assistant Examiner* — Minh Phan
(74) *Attorney, Agent, or Firm* — Panasonic Patent Center; Dhiren Odedra; Kerry Culpepper

(57) ABSTRACT

A camera system that can maintain a good focus state regardless of the speed of zooming during variable proportion zooming is provided. The camera system has a control portion that, based on information on the speed of the change in the focal length, determines whether to control a focus lens drive portion in either a first control mode or a second control mode. If it determines that control is to be performed in the first control mode, then the control portion controls the focus lens drive portion so that it drives a focus lens in the direction that brings a predetermined captured object into focus based on estimated values for auto focusing that have been calculated from the image data at various positions by controlling the focus lens drive portion so that the captured object distance is moved forward and backward in the optical axis direction. If the control portion determines that control is to be performed in the second control mode, then the control portion controls the focus lens drive portion based on a tracking table.

17 Claims, 10 Drawing Sheets

CAMERA SYSTEM, CAMERA BODY, INTERCHANGEABLE LENS UNIT, AND FOCUS CONTROL METHOD

CROSS-REFERENCE TO RELATED APPLICATIONS

This application claims priority to Japanese Patent Application No 2008-82792 filed on Mar. 27, 2008, the entire disclosure of which is hereby incorporated herein by reference.

BACKGROUND

1. Technical Field

This technology relates to digital camera systems primarily for capturing still images and camera systems such as video cameras primarily for capturing moving images. In particular, it relates to camera systems having an optical system that is capable of varied proportion zooming. It also relates to camera bodies, interchangeable lens units, focus control methods, and programs, for use in camera systems.

2. Description of the Related Art

JP H04-42108A discloses a camera with an inner focus-type zoom lens. Inner focus-type zoom lenses change the focus state when the focal distance is altered through varied proportion zooming. JP H04-42108A discloses performing contrast-type auto focusing in order to keep the optical image of the object being captured in focus during varied proportion zooming. JP H04-42108A discusses the difficulty of focusing accurately during varied proportion zooming using contrast-based auto focusing. It also discloses determining the distance to the object being captured, and then, based on the results of this determination, selecting one of a plurality of focus lens group movement locuses that are stored in a memory portion, and moving the focus lens group based on that movement locus.

JP H04-42108A thus discloses improving the accuracy of camera system focusing during varied proportion zooming. However, with the camera system that is disclosed in JP H04-42108A, the focus lens group is moved based on a movement locus, and thus a good focus state cannot be maintained in a case where there is movement, for example, in the object that is to be kept in good focus during variable proportion zooming. Further, depending on the limitations of the means for driving the focus lens group, contrast-based auto focusing may not be possible when variable proportion zooming is conducted quickly. It may not be possible to maintain a good focus state in this case. In other words, JP H04-42108A does not disclose the maintaining of a good focus state regardless of the speed of zooming during variable proportion zooming.

It is an object of the present technology to provide a camera system, a camera body, an interchangeable lens unit, a focus control method, and a program, with which a good focus state can be maintained regardless of the speed of zooming during variable proportion zooming.

SUMMARY

A camera system is provided with a focus lens, a focus lens drive portion, a focus lens position detection portion, a zoom lens, a zoom lens drive portion, a zoom lens position detection portion, a zooming portion, an imaging portion, an estimated value calculation portion, a tracking table memory portion, and a control portion.

The focus lens is a lens or a lens group for changing the state of focus of an optical image of a captured object by advancing and retreating in the optical axis direction. The focus lens drive portion is for driving the focus lens. The focus lens position detection portion is for detecting the position of the focus lens or a mechanism member that is linked to the focus lens. The zoom lens is a lens or a lens group for changing the focal length of the optical image of the captured object by advancing and retreating in the optical axis direction. The zoom lens drive portion is for driving the zoom lens. The zoom lens position detection portion is for detecting the position of the zoom lens or a mechanism member that is linked to the zoom lens. The zooming portion is an operation portion for effecting driving of the zoom lens. The imaging portion receives the optical image and creates image data. The estimated value calculation portion is for calculating an estimated value for auto focusing, based on the image data that are created by the imaging portion. The tracking table memory portion stores a tracking table that tabulates the relationship between focal lengths that are determined every captured object distance and the position of the focus lens in the optical axis direction. The control portion determines whether to control the focus lens drive portion in a first control mode or a second control mode, based on the information relating to the rate of change in the focal length, and controls the focus lens drive portion based on the control mode that it determines.

If the control portion determines that control is to be performed in the first control mode, then the focus lens drive portion drives the focus lens forward and backward in the optical axis direction so as to change the captured object distance, in accordance with a command from the drive portion, and the estimated value calculation portion calculates estimated values for auto focusing at a plurality of positions at which the focus lens is located when being driven forward and backward in the optical axis direction. The control portion then controls the focus lens drive portion so that it drives the focus lens in a direction that brings the captured object into focus, based on the estimated values for auto focusing at the plurality of positions that were calculated by the estimated value calculation portion.

If the control portion determines that control is to be performed in the second control mode, then it controls the focus lens drive portion based on the tracking table.

This camera system allows for control to be performed switching between a first control mode and a second control mode. The first control mode is a mode in which focus control is performed by a wobbling operation, for example, and thus in a case where the control portion has determined that wobbling is possible, the camera system allows focus control to be appropriately executed by wobbling. On the other hand, focus control can be executed based on a tracking table if the control portion determines that wobbling is not possible.

BRIEF DESCRIPTION OF THE DRAWINGS

Referring now to the attached drawings which form a part of this original disclosure.

DETAILED DESCRIPTION OF THE INVENTION

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

<1: Camera System Configuration>

(1.1: Overview of the Configuration of the Camera System)

Figure 1:
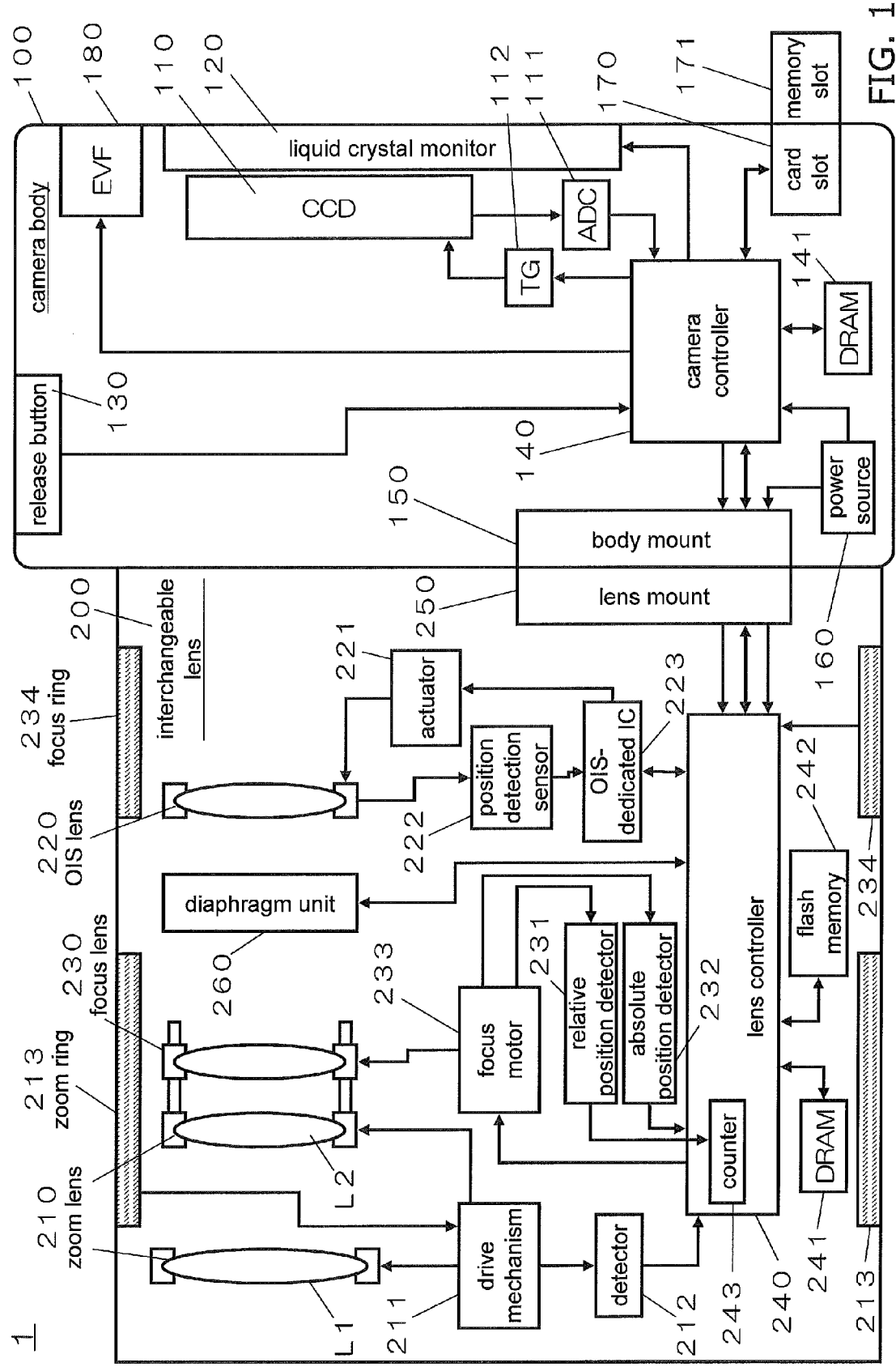
FIG. 1 is a block diagram that shows the configuration of a camera system 1 according to a first embodiment.

FIG. 1 is a block diagram that shows the configuration of a camera system 1 according to the first embodiment.

The camera system 1 is made of a camera body 100 and an interchangeable lens 200 that can be detached from the camera body 100.

The camera system 1 can perform operations for capturing and recording moving images. In this embodiment, this lens-interchangeable camera system can capture and record high quality moving images.

(1.2: Configuration of the Camera Body)

The camera body 100 includes a CCD (Charge Coupled Device) image sensor 110, a liquid crystal monitor 120, a camera controller 140, a body mount 150, a power source 160, and a card slot 170.

The camera controller 140 controls the overall camera system 1, like the CCD image sensor 110, according to commands from an operational member such as a release button 130. The camera controller 140 transmits vertical synchronizing signals to a timing generator 112. In parallel with this, the camera controller 140 creates exposure synchronizing signals based on the vertical synchronizing signals. The camera controller 140 periodically repeatedly transmits the exposure synchronizing signals that are created to a lens controller 240 through the body mount 150 and a lens mount 250. The camera controller 140 uses a DRAM 141 as a working memory during controlling and image processing operations. It should be noted that the camera controller 140 is one example of the body control portion.

The CCD image sensor 110 captures an image of the object that is incident through an interchangeable lens 200 and creates image data. The image data that are created are digitized by an AD converter 111. The camera controller 140 performs various image processing on the image data that have been digitized by the AD converter 111. "Various image processing" here includes gamma correction, white balance correction, error correction, YC conversion, electronic zooming, and JPEG compression, for example.

The CCD image sensor 110 performs operations at a timing that is controlled by a timing generator 112. The CCD image sensor 110 performs operations such as capturing still images and capturing moving images. The operation of capturing moving images includes an operation for capturing through images. Here, "through image" is used to refer to captured moving images whose data are not stored on a memory card 171. Through images are primarily moving images and are displayed on the liquid crystal monitor 120 and/or an electronic view finder 180 (hereinafter, also "EVF") for the purpose of choosing the layout for capturing moving images or still images. The operation for capturing moving images also includes a moving image recording operation. The "moving image recording operation" includes the moving image capture operation and an operation for recording moving image data to the memory card 171. It should be noted that the CCD image sensor 110 is an example of the imaging portion. The imaging portion is a concept that is inclusive of CMOS image sensors and the like.

The liquid crystal monitor 120 displays images that are defined by the image data for display that have been subjected to image processing by the camera controller 140. The liquid crystal monitor 120 can selectively display both moving and still images. The liquid crystal monitor 120 is but one example of a display portion. Other examples of devices that can display images and that may be used as the display portion include organic ELs, inorganic ELs, and plasma display panels.

The electronic view finder 180 (hereinafter may also be referred to as "EVF 180") displays images that are defined by the image data for display that have been subjected to image processing by the camera controller 140. The EVF 180 can selectively display both moving and still images. The information displayed on the liquid crystal monitor 120 and the EVF 180 may be the same or different. This depends on the control by the camera controller 140. The EVF 180 has an EVF liquid crystal monitor for displaying images and the like, an EVF optical system for magnifying the display of the EVF liquid crystal monitor, and an eyepiece for the user to look closer.

The memory card 171 can be mounted in the card slot 170. The card slot 170 controls the memory card 171 based on control from the camera controller 140. Specifically, the card slot 170 stores image data on the memory card 171. The card slot 170 outputs image data from the memory card 171, and also stores moving image data on the memory card 171. The card slot 170 outputs moving image data from the memory card 171.

The memory card 171 can store image data that are created by the camera controller 140 through image processing. For example, the memory card 171 can store JPEG image files. The memory card 171 also can output the image data or the image files that are stored on it. The image data and image files that are output from the memory card 171 are subjected to image processing by the camera controller 140. For example, the camera controller 140 expands the image data or the image files that are obtained from the memory card 171 and creates image data for display.

The memory card 171 can also store the moving image data that are created by the camera controller 140 through image processing. For example, the memory card 171 can store moving image files that have been compressed in accordance with the moving image compression standard H.264/AVC. The memory card 171 also can output the moving image data or the moving image files that are stored on it. The moving image data and moving image files output from the memory card 171 are subjected to image processing by the camera controller 140. For example, the camera controller 140 expands moving image data and moving image files obtained from the memory card 171 to create moving image data for display. It should be noted that the memory card 171 is an example of the memory portion. The memory portion may be a type that can be attached to and detached from the camera system like the memory card 171, or it may be a type that is fixed to or installed within the camera system.

The power source 160 supplies power for use by the camera system 1. The power source 160 can be a dry cell or a rechargeable battery, for example. It also may supply power, to the camera system 1, that is being supplied from the outside by a power cord or the like.

The body mount 150 can mechanically and electrically connect to the lens mount 250 of the interchangeable lens 200. Data are sent and received between the camera body 100 and the interchangeable lens 200 via the body mount 150 and the lens mount 250. Specifically, mechanical and electrical connection between the body mount 150 and the lens mount 250 establishes a route for sending and receiving data (data communication) between the camera controller 140 and the lens controller 240. The body mount 150 transmits exposure synchronizing signals that it receives from the camera controller 140 to the lens controller 240 via the lens mount 250. It also sends other controls signals that it receives from the camera controller 140 to the lens controller 240 via the lens mount 250. The body mount 150 also sends signals that it receives from the lens controller 240 via the lens mount 250 to the camera controller 140. The body mount 150 also supplies the power that it receives from the power source 160 to the entire interchangeable lens 200 through the lens mount 250.

(1.3: Configuration of the Interchangeable Lens)

The interchangeable lens 200 is provided with an optical system, the lens controller 240, the lens mount 250, and a diaphragm unit 260.

The optical system of the interchangeable lens 200 includes a zoom lens 210, a zoom ring 213, an OIS lens 220, and a focus lens 230.

The zoom lens 210 is a lens for changing the magnification of the optical image of the captured object (hereinafter also referred to as "object image") that is formed on the optical system of the interchangeable lens 200, or in order words, the focal length of the optical system. The zoom lens 210 is made from a single lens or a plurality of lenses. The zoom lens 210 includes a first lens group L1 and a second lens group L2 of the optical system. The zoom lens 210 changes the focal length by moving in a direction parallel to the optical axis AX of the optical system.

The zoom ring 213 is a cylindrical member that can rotate about the outer circumferential surface of the interchangeable lens 200. The zoom ring 213 is an example of the zooming portion for manipulating the focal length, and is an example of a zooming portion with which the focal length is determined in accordance with the position after adjustment.

A drive mechanism 211 transfers operation of the zoom ring 213 that is made by the user to the zoom lens 210, and moves the zoom lens 210 in the direction of the optical axis AX of the optical system. As one example, the drive mechanism 211 has a cam mechanism that converts the rotational motion of the zoom ring 213 into linear motion by the zoom lens 210. The drive mechanism 211 is an example of the zoom lens drive portion.

A detector 212 detects the amount of driving by the drive mechanism 211. The lens controller 240 and/or the camera controller 140 can determine the focal length of the optical system by obtaining the information that is detected by the detector 212. Further, the lens controller 240 and/or the camera controller 140 can determine the position, in the optical axis AX direction, of the zoom lenses (L1, L2, etc.) within the interchangeable lens 200 by obtaining the information detected by the detector 212. It should be noted that it is sufficient for the drive mechanism 211 to be capable of moving the zoom lens 210 in the direction of the optical axis AX. For example, it is possible for the drive mechanism 211 to transfer drive power from a drive power generator, such as a motor, to the zoom lens 210 according to the rotational position of the operational member, such as the zoom ring 213, so as to move the zoom lens 210 to a position in the optical axis AX direction that corresponds to the rotational position of the zoom ring 213.

The OIS lens 220 is a lens for correcting blurring of the captured object that is formed in the optical system of the interchangeable lens 200. Specifically, the OIS lens 220 corrects blurring in the captured object image that occurs due to blurring in the camera system 1. The OIS lens 220 reduces the relative blurring between the CCD image sensor 110 and the captured object image by moving in the direction that cancels out the blurring of the camera system 1. Specifically, the OIS lens 220 reduces blurring in the captured object image on the CCD image sensor 110 by moving the in the direction that cancels out the blurring of the camera system 1. The OIS lens 220 is made from a single lens or a plurality of lenses. An actuator 221 receives control from an OIS-dedicated IC 223 and drives the OIS lens 220 in the plane perpendicular to the optical axis AX of the optical system.

The actuator 221 can be achieved using a magnet and plate coil, for example.

A position detection sensor 222 is a sensor for detecting the position of the OIS lens 220 in the plane perpendicular to the optical axis AX of the optical system. The position detection sensor 222 can be achieved using a magnet and a Hall element.

The OIS-dedicated IC 223 controls the actuator 221 based on the results of the detection by the position detection sensor 222 and the results of detection by a blur detector such as a gyro sensor. The OIS-dedicated IC 223 obtains the results of the detection by the blur detector from the lens controller 240. The OIS-dedicated IC 223 sends a signal that indicates the state of optical image blur correction to the lens controller 240.

It should be noted that the OIS lens 220 is an example of the blur correction portion. As means for correcting blurring of the captured object image that occurs due to blurring in the camera system 1, it is also possible to adopt electronic blur correction that creates corrected image data based on the image data from the CCD. The means for reducing the relative blurring between the CCD image sensor 110 and the captured object image that occurs due to blurring in the camera system 1 may also take on the form of driving the CCD image sensor 110 in a plane that is perpendicular to the optical axis AX of the optical system.

The focus lens 230 is a lens for changing the state of focus of the captured object image that is formed on the CCD image sensor 110 by the optical system. The focus lens 230 is made from a single lens or a plurality of lenses. The focus lens 230 changes the state of focus of the captured object image by moving in the direction parallel to the optical axis AX of the optical system.

A focus motor 233 drives the focus lens 230 such that it moves forward and backward along the optical axis AX of the optical system, based on control by the lens controller 240. This allows the focus state of the captured object image that is formed on the CCD image sensor 110 in the optical system to be changed. The focus motor 233 can drive the focus lens 230 independently from the driving of the zoom lens 210. Specifically, the focus motor 233 drives the focus lens 230 in the optical axis AX direction with reference to the second lens group L2. In other words, the focus motor 233 can change the relative distance in the optical axis AX direction between the second lens group L2 and the focus lens 230. The focus lens 230 and the focus motor 233 move in the optical axis AX direction along with the second lens group L2. Thus, when the second lens group L2 moves in the optical axis AX direction as the result of zooming, the focus lens 230 and the focus motor 233 also move in the optical axis AX direction. When the second lens group L2 is still in the optical axis AX direction, the focus motor 233 can drive the focus lens 230 in the optical axis AX direction with reference to the second lens group L2.

The focus motor 233 is described in further detail.

Figure 2:
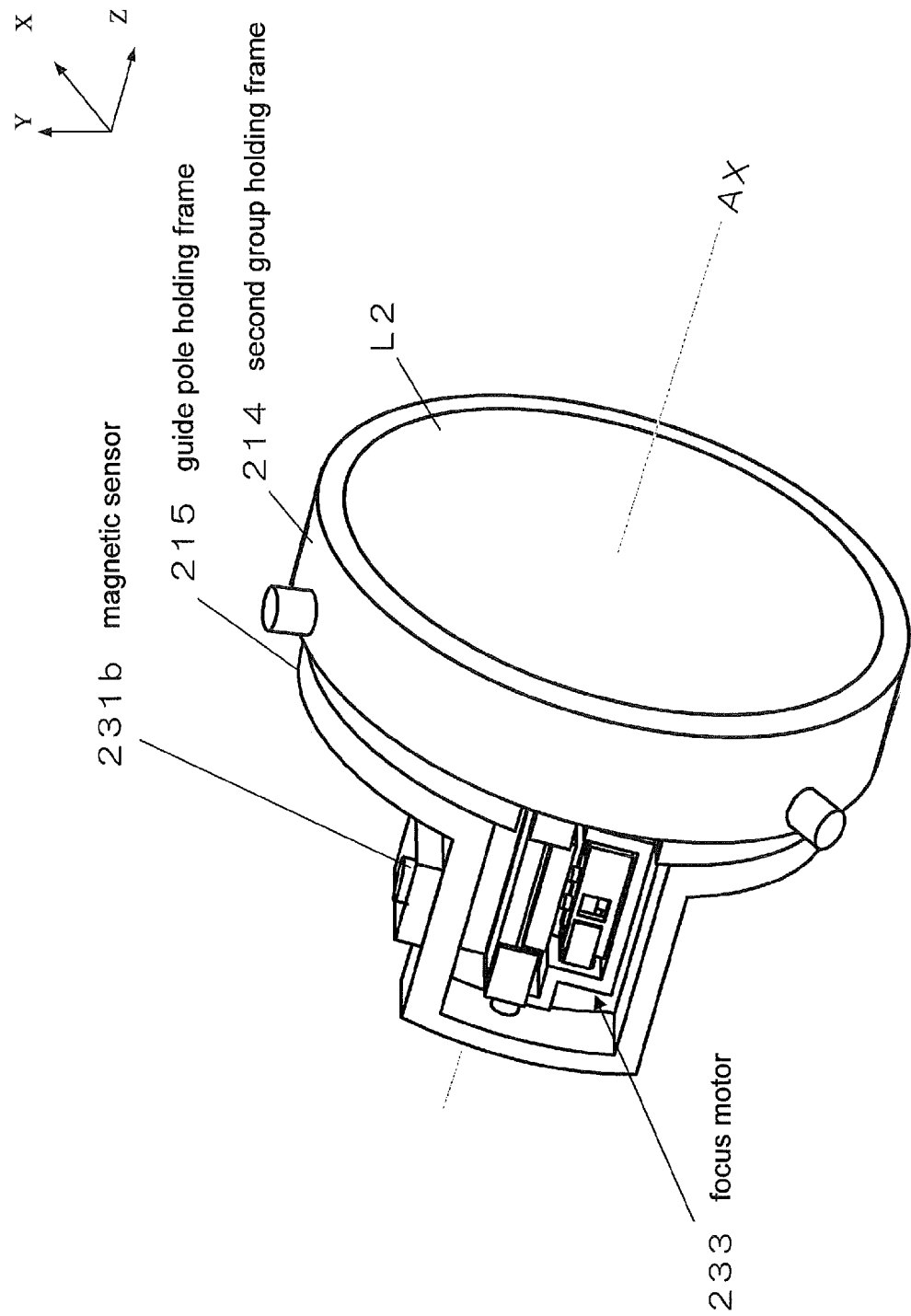
FIG. 2 is a structural view of a portion of the interchangeable lens 200 including the second lens group and the focus lens 230.
Figure 3:
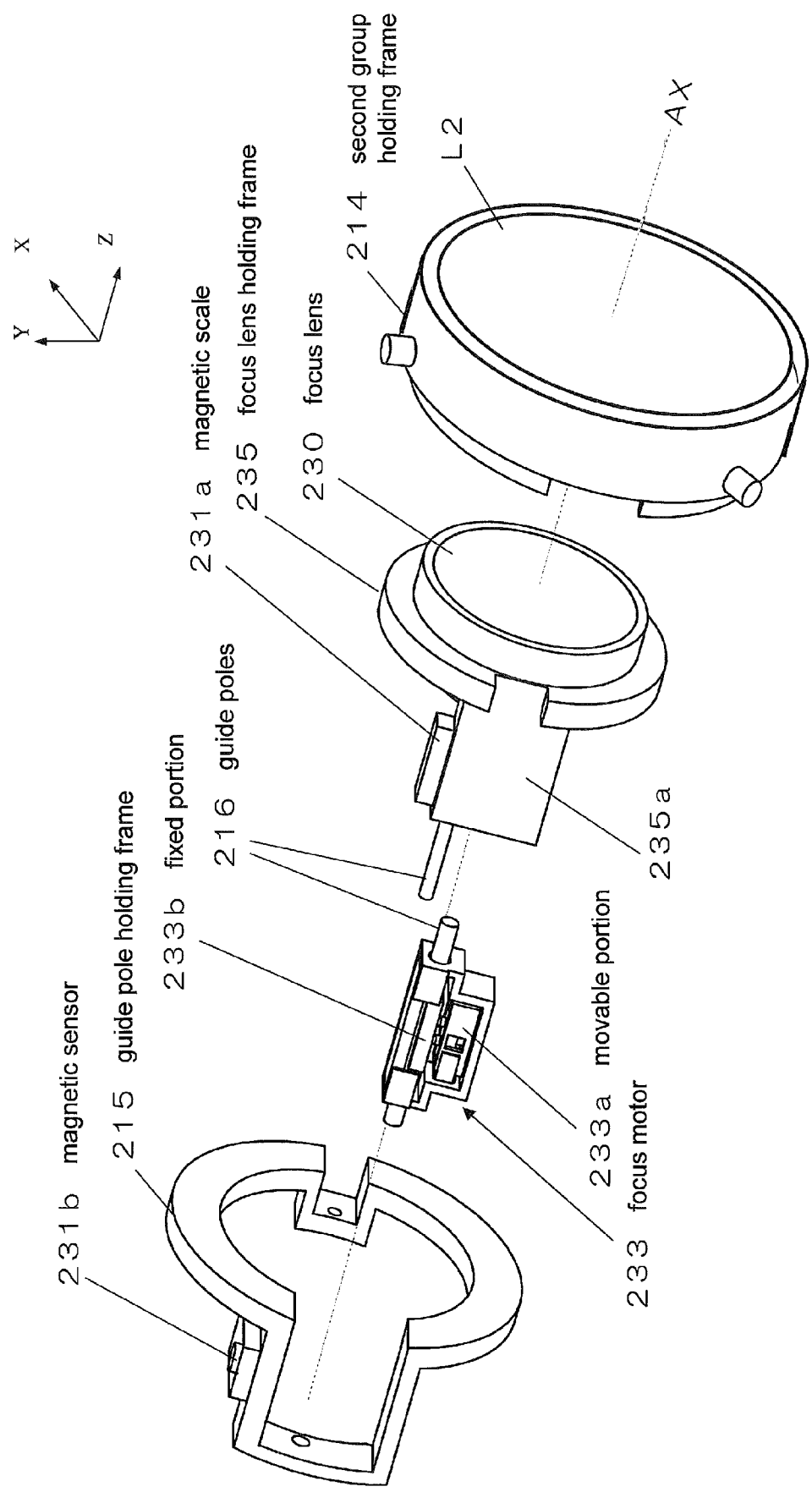
FIG. 3 is a development view of portion of the structure of the interchangeable lens 200 including the second lens group and the focus lens 230.

FIG. 2 is a structural view of a portion of the interchangeable lens 200 including the second lens group and the focus lens 230. FIG. 3 is a development view of a portion of the structure of the interchangeable lens 200 including the second lens group and the focus lens 230.

The focus lens 230 is held by a focus lens holding frame 235. The second lens group L2 is held by a second group holding frame 214. By rotationally operating the zoom ring 213, the drive mechanism 211 moves the second group holding frame 214 in the optical axis AX direction. One end of each of two guide poles 216 is fixed to the second group holding frame 214 parallel to the optical axis AX direction. The other ends of the guide poles 216 are fixed to a guide pole holding frame 215. The guide pole holding frame 215 is fixed to the second group holding frame 214. The second group holding frame 214 is disposed on the captured object side of the guide pole holding frame 215. The guide poles 216 pass through the focus lens holding frame 235. The focus lens holding frame 235 is provided such that it can pivot with respect to the guide poles 216.

The focus motor 233 is made of a movable portion 233a and a fixed portion 233b. The movable portion 233a is fixed by a screw or the like to a lateral face 235a of the focus lens holding frame 235. The fixed portion 233b is fixed to one of the guide poles 216. The movable portion 233a moves to the fixed portion 233b parallel to the optical axis AZ due to the focus motor 233 generating a drive force in the direction parallel to the optical axis AZ. Along with this, the focus lens 230 moves in the direction parallel to the optical axis AZ toward the second lends group L2. The guide poles 216, the focus lens holding frame 235 and the focus motor allow the focus lens 230 to move in the direction parallel to the optical axis AX of the optical system, and restrict it such that it cannot move perpendicular to the optical axis AX.

In this embodiment, the focus motor 233 is an ultrasonic motor. An ultrasonic motor has a piezoelectric layer and an electrode layer. By applying two lines of alternating voltage with the same frequency, same amplitude, but with phases that are 90-degrees different from one another, to the electrode layer, the ultrasonic motor harmonically generates longitudinal and transverse vibrations. The ultrasonic motor then causes elliptical motion of a drive element that is fixed near the anti-node of the transverse vibration and generates a drive force in a linear direction. The drive element is pushed against the fixed portion 233b, and the friction between the drive element and the fixed portion 233b generates a drive force. Setting the phases of the two lines of AC voltage to approximately 90-degrees apart from one another in the other direction results in the drive element having elliptical motion in the opposite direction, and generates a drive force in the opposite direction. It should be noted that the ultrasonic motor is an example of a linear actuator for performing linear driving. The ultrasonic motor is also an example of the focus motor 233. The focus motor 233 is not limited to this, and it can also be achieved by a DC motor, a stepping motor, and a servo motor. The focus motor 233 is an example of the focus lens drive portion.

A relative position detector 231 and an absolute position detector 232 are encoders for creating signals that indicate the drive state of the focus lens 230.

The relative position detector 231 has a magnetic scale 231a and a magnetic sensor 231b. The magnetic scale 231a is provided in a single unit with the focus lens holding frame 235, and is magnetized at a constant interval in the direction parallel to the optical axis AZ. The magnetic sensor 231b detects changes in the magnetism by moving above the magnetic scale 231a, and outputs a signal that corresponds to the change in the magnetism. The magnetic sensor 231b is for example an MR sensor. The magnetic sensor 231b is fixed to the guide pole holding frame 215 and is disposed such that it a predetermined distance is maintained between it and the magnetic scale 231a.

The absolute position detector 232 is for detecting the starting position of the focus lens holding frame 235 with respect to the second group holding frame 214. In other words, the absolute position detector 232 is an origin detector for detecting the starting position of the focus lens 230 with respect to the second lens group L2. The absolute position detector 232 is a photo sensor, for example. The lens controller 240 drives the focus lens 230 to the starting position and recognizes that the focus lens 230 is at the starting position by a signal from the absolute position detector 232. The origin is the absolute position (the principally determined position within the camera system 1).

A counter 243 is provided within the lens controller 240, and the counter 243 counts extreme values of magnetism change by a signal that is output from the relative position detector 231. Then, when an extreme value of magnetism change is detected when moving the focus lens 230 in a first direction that is parallel to the optical axis AX, the count is increased by (an increment of) one. When an extreme value of magnetism change is detected when moving the focus lens 230 in a second direction that is opposite the first direction parallel to the optical axis AX, the count is decreased by (a decrement of) one.

In this way, the lens controller 240 can ascertain the position in the optical axis AX direction of the focus lens 230 with respect to the second lens group L2 by detecting the its position relative to the starting position, which is the absolute position. As discussed above, the lens controller 240 can ascertain the position in the optical axis AX direction of the second lens group L2 within the interchangeable lens 200. Thus, the lens controller 240 can ascertain the position in the optical axis AX direction of the focus lens 230 within the interchangeable lens 200. The relative position detector 231 and the absolute position detector 232 are examples of the focus lens position detection portion. The focus lens position detection portion can directly detect the position of the focus lens, or it can detect the position of a mechanism member that is linked to the focus lens.

The diaphragm unit 260 is a light amount adjustment member for adjusting the amount of light that passes through the optical system. The diaphragm unit 260 has a diaphragm blade that can block some of the beam of light that passes through the optical system, and a diaphragm drive portion that drives the diaphragm blade to change the amount of light that is blocked and thereby adjust the light amount. The diaphragm unit 260 also has an ND filter that allows some of the incident light to pass through and by doing so emits less light than the amount of light that is incident, and an ND drive portion that drives the ND filter to change the amount of the light beam that passes through the optical system and is incident on the ND filter so as to adjust the light amount. The camera controller 140 sends a command to the diaphragm unit 260 based on the amount of light that is received by the CCD image sensor 110, whether a still image or a moving image is to be captured, and whether or not a command for a priority setting for the diaphragm value has been made.

The lens controller 240 controls the entire interchangeable lens 200, including the OIS-dedicated IC 223 and the focus motor 233, based on control signals from the camera controller 140. The lens controller 240 receives signals from the detector 212, the OIS-dedicated IC 223, the relative position detector 231, and the absolute position detector 232, for example, and transmits these to the camera controller 140. The lens controller 240 communicates with the camera controller 140 (sends and receives data) via the lens mount 250 and the body mount 150. When performing control, the lens controller 240 uses the DRAM 241 as a working memory. A flash memory 242 stores the programs and parameters that are used when control is performed by the lens controller 240.

<2: Operation of the Camera System>

(2.1: Image Capture Preparation Operation)

First, the operation of the camera system 1 for preparing to capture images is described.

Figure 4:
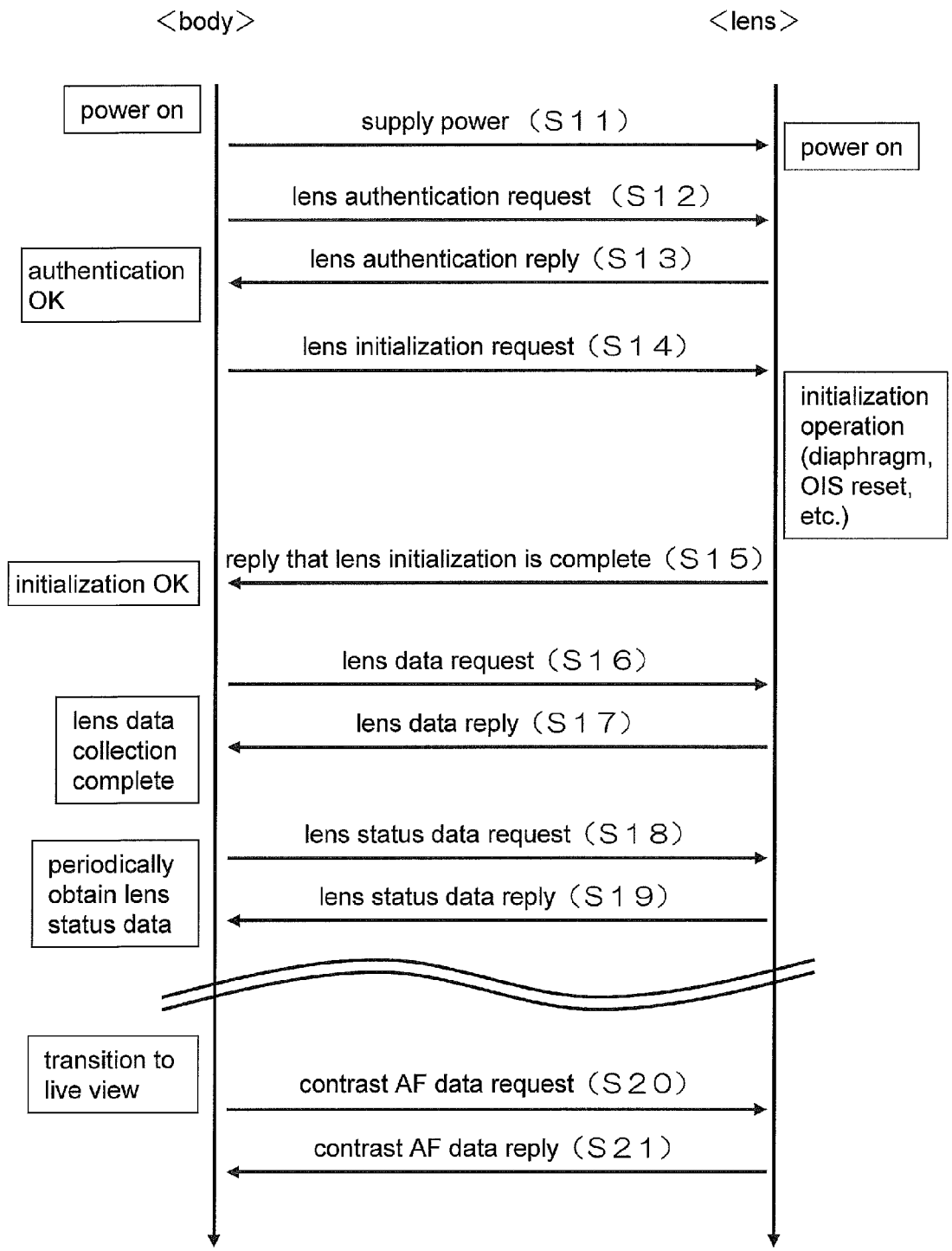
FIG. 4 shows transmission and reception signals for describing the image capture preparation operation of the camera system 1.

FIG. 4 shows the transmission and the reception of signals in order to describe the operation of the camera system 1 for preparing to capture images.

When the user powers on the camera body 100 once the interchangeable lens 200 has been attached to the camera body 100, the power source 160 starts supplying power to the interchangeable lens 200 through the body mount 150 and the lens mount 250 (S11).

Next, the camera controller 140 requests authentication information for the interchangeable lens 200 from the lens controller 240 (S12). Here, the "authentication information of the interchangeable lens 200" includes information relating to whether or not the interchangeable lens 200 has been mounted and information on whether or not accessories are attached. The lens controller 240 sends the authentication information to the camera controller 140 in response to the request for lens authentication information from the camera controller 140 (S13).

Next, the camera controller 140 sends a request to the lens controller 240 to perform an initialization operation (S14). The lens controller 240 receives this and performs an initialization operation to reset the diaphragm and to reset the OIS lens 220, for example. The lens controller 240 then replies to the camera controller 140 to indicate that the lens initialization operation is complete (S15).

Next, the camera controller 140 sends a request for lens data to the lens controller 240 (S16). The lens data are stored on the flash memory 242. Here, the lens controller 240 reads the lens data from the flash memory 242 and sends them to the camera controller 140 (S17). Here, "lens data" refer to characteristic values that are unique to the interchangeable lens 200, such as lens name, F-number, and focal length.

When the camera controller 140 acknowledges the lens data of the interchangeable lens 200 that is mounted to the camera body 100, it becomes possible to capture images. In this state, the camera controller 140 periodically requests lens state data that indicate the state of the interchangeable lens 200, from the lens controller 240 (S18). The "lens state data" for example include zoom factor information for the zoom lens 210, position information of the focus lens 230, and diaphragm value information. In response to this request, the lens controller 240 replies to the camera controller 140 with the requested lens state data (S19).

In this state, the camera system 1 can operate in a control mode in which an image defined by the image data that have been created by the CCD image sensor 110 is displayed on the liquid crystal monitor 120 as a through image. This control mode is called the "live view mode." In live view mode, the through image is displayed on the liquid crystal display 120 as a moving image so that the user can choose a style for capturing still images while viewing the liquid crystal monitor 120. The user can determine whether or not to execute the live view mode. In addition to the live view mode, other control modes that can be selected by the user include a control mode for guiding the captured object image from the interchangeable lens 200 to an optical view finder (not shown). In order to achieve this control mode it is necessary to have a movable mirror or the like for guiding the captured object image to the optical view finder (not shown). The contrast format is one format for auto focusing in the live view finder. This is because in live view mode, image data are constantly being created in the CCD image sensor 110, and thus it is easy to carry out contrast-type auto focusing (hereinafter referred to as "contrast AF") using those image data.

When performing contrast-type auto focusing, the camera controller 140 requests contrast AF data from the lens controller 240 (S20). The contrast AF data are necessary when performing contrast-type auto focusing, and for example include the focus drive speed, focus shift amount, image zoom factor, and information on whether or not contrast AF is necessary. The camera controller 140 calculates an estimated value for auto focusing, based on the image data that have been created. In this embodiment, the image sharpness is calculated as the estimated value. The method that is used for calculating the sharpness is widely used in contrast AF and thus is not explained here. The camera controller 140 is an example of the estimated value calculation portion.

(2.2: Zoom Operation)

The zoom operation of the camera system 1 is described next. The following description of the zoom operation of the camera system 1 is divided between zooming in "electronic tracking mode" and zooming in "constant AF mode."

(2.2.1: Electronic Tracking Mode)

With the camera system 1, when the user manipulates the zoom ring 213, the drive mechanism 211 transfers this manipulation to the zoom lens 210 and moves the zoom lens 210 in the optical axis AX direction of the optical system, as was discussed previously. Thus, the optical system changes the magnification of the captured object image (hereinafter, "varied proportion zooming"). At this time, the second lens group L2 also moves in the optical axis AX direction. Then, if the focus motor 233 is not driven to move the position of the focus lens 230, then the focus lens 230 moves in the optical axis AX direction while maintaining a constant distance from the second lens group L2. The result is a change in the state of focus of the captured object image that is formed on the CCD image sensor 110 by the optical system of the camera system 1. In other words, there is a change in the object point distance from the object that is brought into focus on the CCD image sensor 110 to the optical system (the object point distance). Since focusing was performed on the object prior to varied proportion zooming, focusing is no longer performed on the object after varied proportion zooming. Hereinafter, "captured object distance" refers to the distance from the object that is being focused on the CCD image sensor 110 to the optical system. "Captured object distance" is a concept that includes the object point distance and the conjugate distance (the distance between images). The conjugate distance (distance between images) refers to the distance between the object and its image, about the lens. In other words, the conjugate distance (distance between images) is the distance in the optical axis AX direction from the object that is being focused on the CCD image sensor 110 to the captured object image on the CCD image sensor 110.

Accordingly, the lens controller 240 drives the focus motor 233 along with the varied proportion zooming. Specifically, the focus motor 233 moves the focus lens 230 in the optical axis AX direction such that the captured object distance is kept substantially constant through varied proportion zooming. It should be noted that "keeping the captured object distance substantially constant" is a concept that includes the degree to which the captured object distance is kept within a predetermined depth of field.

In the camera system 1, a "tracking table" tabulates the relationship between the captured object distance, even through varied proportion zooming, and the position in the optical axis AX direction of the focus lens 230 where the captured object is substantially constant distance even through varied proportion zooming. In other words, the "tracking table" shows the relationship between the "focal length" and the "position in the optical axis AX direction of the focus lens 230" that is determined at every captured object distance.

It should be noted that "focal length" can also be considered to be the rotational position of the zoom ring 213, the position of the zoom lens 210 in the optical axis AX direction, or the result of detection by the detector 212. In other words, "focal length" can be explicitly determined as long as the rotational position of the zoom ring 213 or the position of the zoom lens 210 in the optical axis AX direction have been determined.

The "position in the optical axis AX direction of the focus lens 230" also can be understood as the position in the optical axis AX direction of the focus lens 230 with respect to the second lens group L2, and as the position of the focus lens 230 in the optical axis AX direction within the interchangeable lens 200. In other words, the "position of the focus lens 230 in the optical axis AX direction" can be explicitly determined as long as the position in the optical axis AX direction of the focus lens 230 with respect to the second lens group L2, or the position in the optical axis AX direction of the focus lens 230 within the interchangeable lens 200 have been determined.

The tracking table that is used in this embodiment can also use any of the corresponding relationships that are discussed above.

Figure 5:
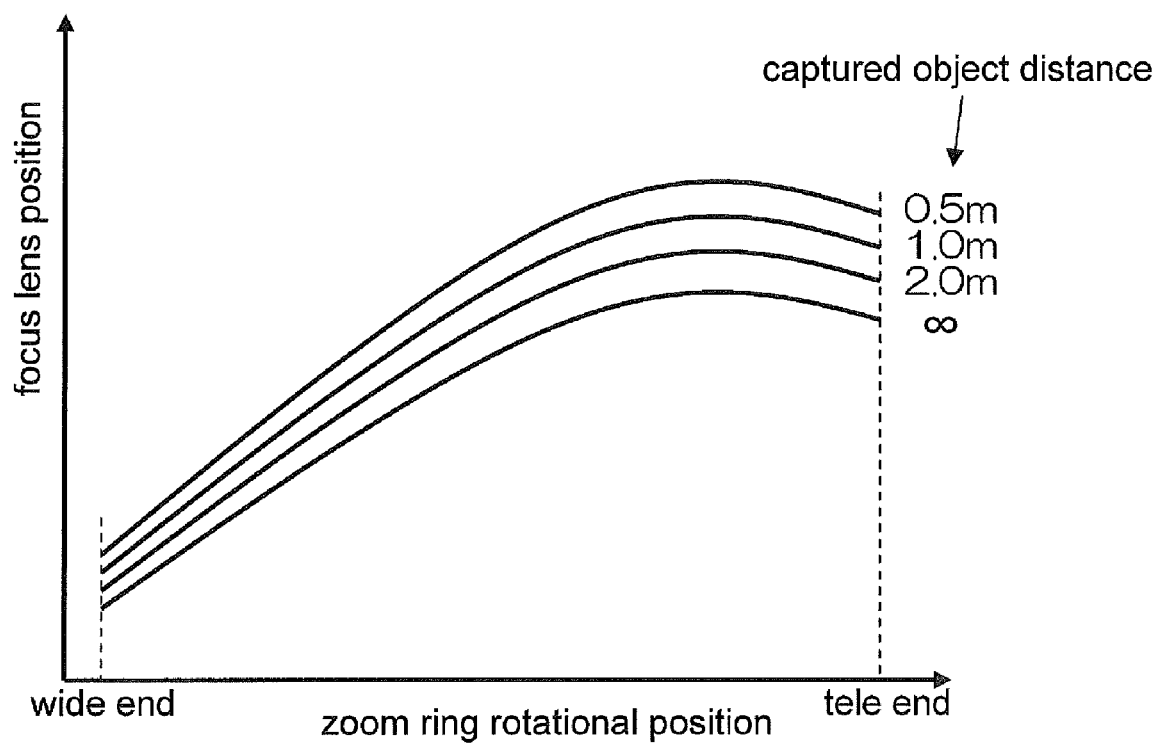
FIG. 5 is a graph that illustrates the tracking table of the interchangeable lens according to this embodiment.

FIG. 5 is a graph of the tracking table (tracking table data) of the interchangeable lens 200 according to this embodiment. The tracking table is stored in the flash memory 242 in the interchangeable lens 200. Specifically, the relationship between the information on the rotational position of the zoom ring 213 and the information on the position of the focus lens 230 in the optical axis AX direction within the interchangeable lens 200 is stored each captured object distance in the flash memory 242 as table information. For example, tracking data are stored at captured object distances of 0.5 m, 1.0 m, 2.0 m, and ∞, for example. The information on the rotational position of the zoom ring 213 can for example be obtained (calculated) from the output from the detector 212. In FIG. 5, Wide End expresses the wide angle end of the optical system of the camera system 1, and Tele End expresses the telephoto end of the optical system of the camera system 1. It should be noted that the tracking table holds the zoom ring rotational position and focus lens position as discrete information (data) divided into several segments, and the number of segments generally is determined such that if the captured object distance is constant, they fit within a predetermined depth of field even when the zoom ring 213 has been rotated. It is also possible for the tracking table to be polynomial (calculated by computation) rather than composed of numerous separate, discrete data (information). It should be noted that the flash memory 242 is an example of the tracking table memory portion.

The lens controller 240 can change its control of the focus lens depending on the mode, and can control the focus motor 233 based on the tracking table and drive the focus lens 230 in the optical axis AX direction. Below, the control mode in which the lens controller 240 controls the focus motor 233 based on the tracking table to drive the focus lens 230 in the optical axis AX direction is called the "electronic tracking mode," and operation due to this control mode is called "electronic tracking." It should be noted that in the camera system 1, it is also possible for the camera controller 140 to have this control mode (electronic tracking mode) and to perform electronic tracking by sending commands to the lens controller 240.

<<Flowchart Description of Electronic Tracking>>

Figure 6:
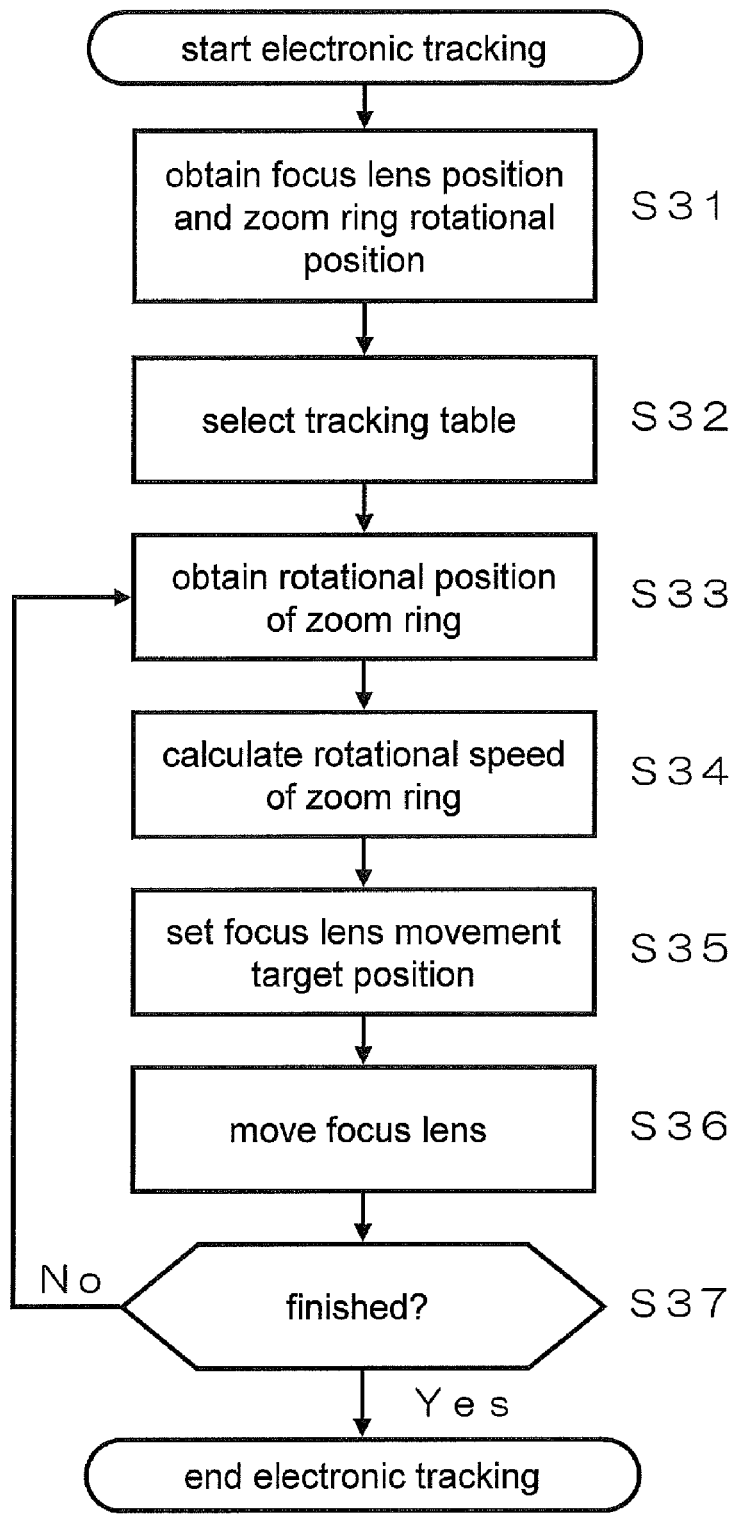
FIG. 6 is a flowchart for describing electronic tracking.

FIG. 6 is a flowchart for describing the operation of the camera system 1 in the electronic tracking mode.

Figure 7:
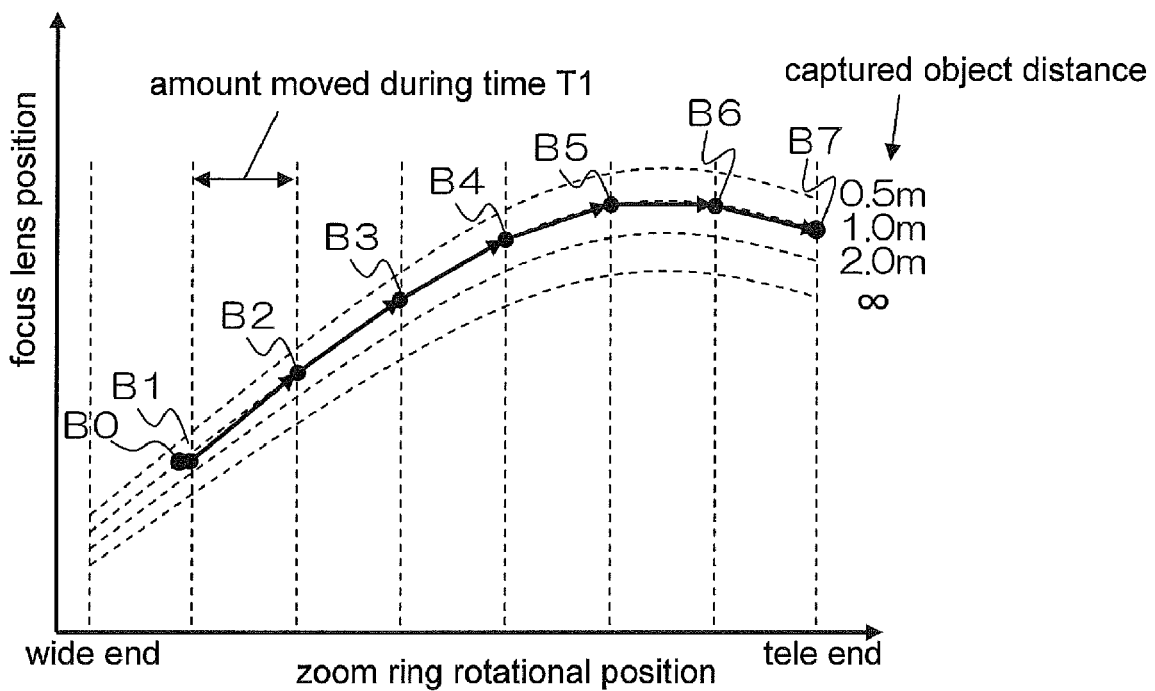
FIG. 7 is a diagram for describing an example of the rotational position of the zoom ring and the movement of the focus lens position during electronic tracking.

FIG. 7 is a diagram for describing the (example) relationship between the rotational position of the zoom ring and the position of the focus lens during electronic tracking (during control according to the electronic tracking mode). The curved dashed lines in FIG. 7 indicate (the data curves of) the tracking table.

Electronic tracking is started by a command from the camera controller 140. For example, in the live view mode, the camera controller 140 sends a command to start electronic tracking to the lens controller 240 when auto focus is no longer active. The lens controller 240 starts electronic tracking.

The following description is of the operation in the camera system 1 during electronic tracking mode, and is made in reference to FIGS. 6 and 7. It should be noted that the following description is made according to the order of the flowchart of FIG. 6.

(Step S31):

The lens controller 240 first obtains the information related to the position of the focus lens 230 that corresponds to the captured object distance. In this embodiment, this information is the position in the optical axis AX direction of the focus lens 230 within the interchangeable lens 200.

The lens controller 240 uses the relative position detector 231, the absolute position detector 232, and the counter 243 to calculate the position of the focus lens 230 in the optical axis AX direction with respect to the second lens group L2, and uses the detector 212 to calculate the position in the optical axis AX direction of the second lens group L2 within the interchangeable lens 200, and from these calculates the position, in the optical axis AX direction, of the focus lens 230 within the interchangeable lens 200.

The lens controller 240 also obtains the information relating to the position of the focus lens 230 that corresponds to the focal length. In this embodiment, this information is the output of the detector 212, or in other words, it is the rotational position of the zoom ring 213.

In the example of FIG. 7, the lens controller 240 determines that it is at the position of B0.

Next, the procedure is advanced to step S32.

(Step S32):

The lens controller 240 selects the tracking table that corresponds to the captured object distance. Below, this tracking table will be used until the end of electronic tracking.

The tracking table for a 1.0 m captured object distance is selected in the example of FIG. 7.

Next, the procedure is advanced to step S33.

(Step S33):

The lens controller 240 obtains the information relating to the position of the focus lens 230 that corresponds to the focal length. In this embodiment, this information is the output of the detector 212, or in other words, it is the rotational position of the zoom ring 213.

In the example of FIG. 7, the lens controller 240 determines that it is at the position of B1.

Next, the procedure is advanced to step S34.

(Step S34):

The lens controller 240 obtains information related to the rate of change in the focal length. In this embodiment, this information is the rate of change in the value output by the detector 212, or in other words, it is the rotational speed of the zoom ring 213. Specifically, the lens controller 240 obtains the value that is output by the detector at a predetermined timing (time interval), and, using the output value of the detector 212 that was obtained previously, and the period from the time that the previous output value of the detector 212 was obtained (this time shall be t1) to the time that the current output value of the detector 212 was obtained (this time shall be t2), calculates the rate of change in the output value of the detector 212. This value can be regarded as substantially equivalent to the observed value immediately before calculation of the rotational speed of the zoom ring 213 (immediately prior to time t2). The rate of change in the focal length includes information relating to whether the focal length is increasing or decreasing. In this embodiment, the rate of change in the focal length, that is, the rotational speed of the zoom ring 213, is regarded as positive if the focal length is increasing from the wide angle end toward the telephoto end, and is regarded as negative if the focal length is decreasing from the wide angle end toward the telephoto end. It should be noted that the value that is output by the detector 212 can also be obtained periodically at an even shorter interval rather than being obtained only in step S33.

In the example of FIG. 7, the zoom ring 213 is rotated at a constant speed, and the focal length changes by a constant amount. The vertical dashed lines in FIG. 7 represent the position of the zoom ring 213 at each predetermined time T1.

Next, the procedure is advanced to step S35.

(Step S35):

The lens controller 240 estimates the focal length after the predetermined time T1, based on the information relating to the focal length that is obtained in step S33, and the information relating to the rate of change in the focal length that is obtained in step S34. The tracking table is then referenced to obtain the position of the focus lens 230 that corresponds to the estimated focal length. Specifically, the lens controller 240 estimates the rotational position of the zoom ring 213 after the predetermined time T1 based on the rotational position and the rotational speed of the zoom ring 213, which are obtained in step S33. The tracking table is then referenced to obtain the position of the focus lens 230 in the optical axis AX direction that corresponds to the estimated rotational position of the zoom ring 213. The lens controller 240 then sends a command to the focus motor 233 so that it moves the focus lens 230 to this position, which is considered the target position to which to move the focus lens 230.

In the example of FIG. 7, the horizontal axis value at B2 is estimated as the rotational position of the zoom ring 213, and B2 on the tracking table is found at that value and the value of B2 on the vertical axis is obtained as the target movement position.

Next, the procedure is advanced to step S36.

(Step S36):

The focus motor 233 moves the focus lens 230 to the target movement position.

In the example of FIG. 7, the focus lens 230 is moved to the position of B2.

Next, the procedure is advanced to step S37.

(Step S37):

The lens controller 240 determines whether or not a command to end electronic tracking has been received. When an end command has been received, the lens controller 240 ends electronic tracking. On the other hand, when the lens controller 240 has not received an end command, the procedure is returned to step S33. The lens controller 240 then repeats the operations of step S33 through step S36 until electronic tracking is to end.

Thus, with the camera system 1, even when the zoom ring 213 is rotationally operated and the focal length of the optical system of the camera system 1 changes as a result, the focus lens 230 is moved based on the tracking table and the captured object distance is kept substantially constant.

In the example of FIG. 7, the focus lens 230 moves to the positions B3, B4, B5, B6, and B7, in that order.

Electronic tracking is ended by a command from the camera controller 140. For example, electronic tracking is ended when live view mode is ended, or when the constant AF mode, which will be discussed later, has been selected.

It should be noted that the predetermined time T1 in step S35 is, for example, a value that is substantially equal (substantially identical) to a single period in which the procedure from step S33 to step S36 is repeated (the processing time from step S33 to step S36).

With the camera system 1, if the zoom ring 213 has not been rotationally operated and the focal length of the optical system of the camera system 1 has not changed, then 0 is calculated as the rotational speed of the zoom ring 213 (step S34). The rotational position of the zoom ring 213 after the predetermined time T1 is estimated to be the same position as the current position, and the target movement position for the focus lens 230 based on the tracking table is the same as the current position of the focus lens 230 (step S35). The focus lens 230 is kept still (the focus lens 230 is not moved) (step S36), and the captured object distance is kept substantially constant.

(2.2.2: Constant AF Mode)

The zoom operation of the camera system 1 in "constant AF mode" is described next.

In the camera system 1, the CCD image sensor 110 is always creating image data when capturing a moving image. The camera controller 140 can change the control of the focus lens depending on the mode, and when capturing moving images it can control the focus motor 233 to drive the focus lens 230 in the optical axis AX direction, based on the image data that are obtained by the camera system 1, to execute contrast AF. In the following discussion, "constant AF mode" refers to the control mode in which during the capturing of moving images, the camera controller 140 controls the focus motor 233 to drive the focus lens 230 in the optical axis AX direction, based on the image data that are obtained by the camera system 1, and the operation of this control mode is also called "constant AF."

Figure 8:
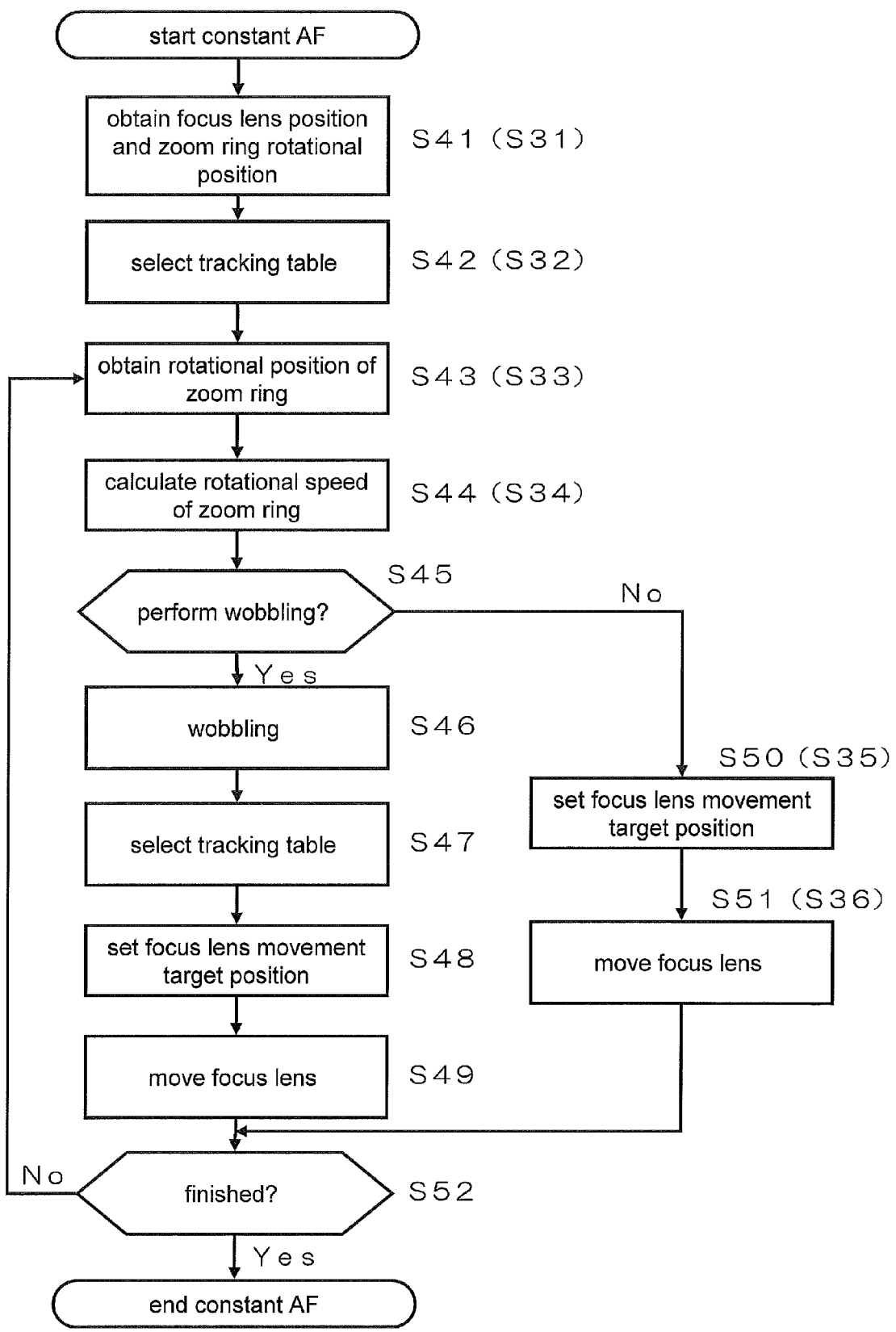
FIG. 8 is a flowchart for describing operation in the constant AF mode.

FIG. 8 is a flowchart for describing operation in the constant AF mode in the camera system 1.

With the camera system 1, control according to the constant AF mode is started with a command from the camera controller 140. For example, when the settings are adjusted to activate auto focus in live view mode, the camera controller 140 sends a command to start the constant AF mode to the lens controller 240. The camera controller 140 and the lens controller 240 then both start control in the constant AF mode.

Further, in the camera system 1, when the setting is adjusted to "moving image capture mode" to capture a moving image and record to the memory card 171, the camera controller 140 sends a command to start the constant AF mode to the lens controller 240. The camera controller 140 and the lens controller 240 then both start control in the constant AF mode.

Referencing FIGS. 8 through 11, the operation during "constant AF mode" in the camera system 1 is described below. It should be noted that the following description is made in accordance with the order of the flowchart of FIG. 8.

(Step S41):

The same operation as described above in step S31 is performed, and the procedure is advanced to step S42.

(Step S42):

The same operation as described above in step S32 is performed, and the procedure is advanced to step S43.

(Step S43):

The same operation as described above in step S33 is performed, and the procedure is advanced to step S44.

(Step S44):

The same operation as described above in step S34 is performed, and the procedure is advanced to step S45.

(Step S45):

The lens controller 240 determines whether to control the focus motor 233 in one of two control modes, these being a "first control mode" in which wobbling is performed, and a "second control mode" in which wobbling is not performed. The specifics of how this determination is made are discussed later. If it is determined that wobbling is to be performed, then the procedure is advanced to step S46. If it is determined that wobbling is not to be performed, then the procedure is advanced to step S50.

(Step S46):

Wobbling is performed. Specifically, the lens controller 240 moves the focus lens 230 forward and backwards in the optical axis AX direction to effect a change in the captured object distance. The CCD image sensor 110 obtains image data at each of the positions. The camera controller 140 calculates the sharpness of the image from the various image data. The camera controller 140 finds (determines) whether moving the focus lens 230 forward or backward in the optical axis AX direction brings a predetermined object into focus (whether it is in the focused state at the captured object distance), based on the sharpness of the image at each calculated focus lens position. The camera controller 140 then sends this information (the information relating to the movement direction of the focus lens 230 that was found by the camera controller 140) to the lens controller 240. The lens controller 240 sends a command to the focus motor 233, and the focus motor 233 moves the focus lens 230 in the direction that was found by the camera controller 140 such that there is a change in the captured object distance.

Figure 9:
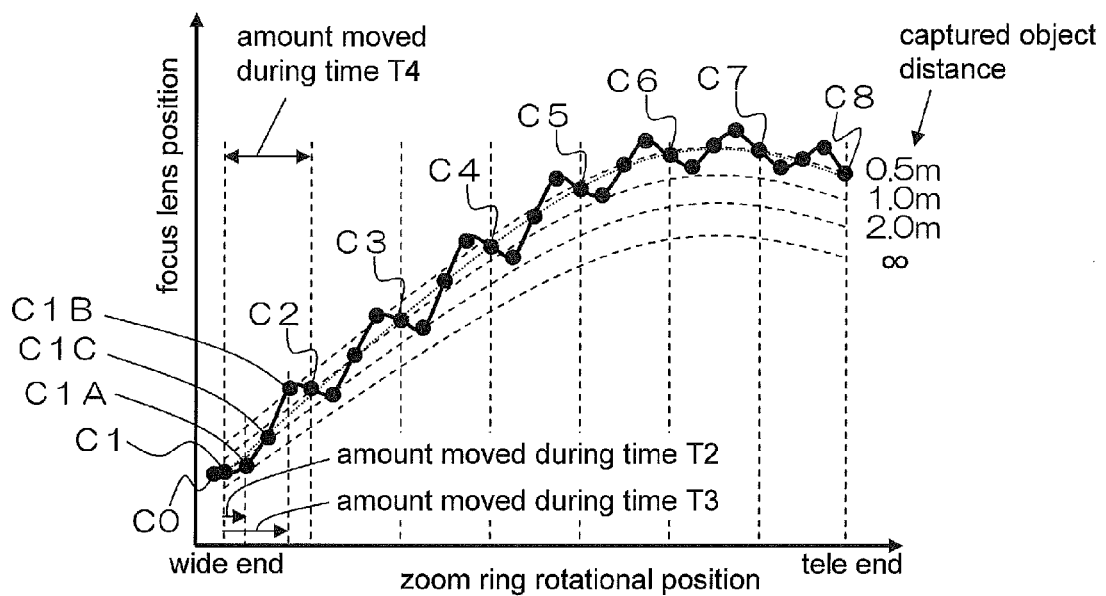
FIG. 9 is a diagram for describing an example of the rotational position of the zoom ring and the movement of the focus lens position in the constant AF mode in a case where it is determined in step S45 that wobbling is to be performed.

FIG. 9 is a diagram for describing (an example of) the relationship between the rotational position of the zoom ring and the position of the focus lens in the camera system 1 during constant AF in a case where it is determined in step S45 that wobbling is to be performed. The operation in the camera system 1 during constant AF is described more specifically using FIG. 9.

In the example of FIG. 9, the processing from step S41 to step S44 yields the position of the focus lens 230 that corresponds to point C1 in FIG. 9, results in selection of the tracking table for the 2.0 m captured object distance, and yields the rotational position of the zoom ring 213 that corresponds to the position C1, as the information on the focal length. It also yields the rotational speed of the zoom ring 213, as the information on the rate of change in the focal length. In the example of FIG. 9, the zoom ring 213 is rotated at a constant speed, and the focal length is changed by a constant amount. The vertical dashed lines in FIG. 9 represent the position of the zoom ring 213 at each predetermined time T4.

In step S46, the lens controller 240 estimates the focal length after the predetermined time T2 (first focal length), the focal length after the predetermined time T3 (second focal length), and the focal length after the predetermine time T4 (third focal length), based on the information relating to the focal length that was obtained in step S43 and the information on the speed of the change in the focal length that was obtained in step S44.

The lens controller 240 then references the tracking table and obtains the position of the focus lens 230 that corresponds to both the estimated first focal length and the second focal length. Specifically, the lens controller 240 estimates the rotational position of the zoom ring 213 after the predetermined time T2 (first rotational position), the rotational position of the zoom ring 213 after the predetermined time T3 (second rotational position), and the rotational position of the zoom ring 213 after the predetermined time T4 (third rotational position), based on the rotational position and the rotational speed of the zoom ring 213 that were obtained in step S43. The lens controller 240 then references the tracking table and obtains the position, in the optical axis AX direction, of the focus lens 230 that corresponds to the estimated rotational positions of the zoom ring 213 (first rotational position and second rotational position).

The lens controller 240 calculates, as a first target movement position for the focus lens 230, the position of the focus lens 230 where the captured object distance is a predetermined amount greater than at the focus lens 230 position in the optical axis AX direction that corresponds to the first rotational position.

The lens controller 240 also calculates, as a second target movement position for the focus lens 230, the position of the focus lens 230 where the captured object distance is a predetermined amount smaller than at the focus lens 230 position in the optical axis AX direction that corresponds to the second rotational position.

It should be noted that it is sufficient for the "predetermined amount" (amount of change in the captured object distance) to be an amount that is sufficient for determining which captured object distance tracking table to select. For example, in a case where the 1.0 m captured object distance is the correct captured object distance, then in the camera system 1 it is sufficient to move the focus lens 230 to a position in front or behind, on the optical axis, the position of the focus lens that corresponds to the 1.0 m captured object distance, so that the tracking table for the 1.0 m captured object distance can be selected. It is sufficient for the "predetermined amount," which is the amount of change in the captured object distance, to be a value that corresponds to the amount that the focus lens 230 moves at this time.

The lens controller 240 sends a command to the focus motor 233 to move the focus lens 230 to the first movement target position after the predetermined time T2, and to the second movement target position after the predetermined time T3. The focus motor 233 moves the focus lens 230 to the first movement target position after the predetermined time T2, and to the second movement target position after the predetermined time T3, based on this command.

In the example of FIG. 9, the lens controller 240 estimates the value on the horizontal axis at point C1A as the first rotational position of the zoom ring 213 the after predetermined time T2, and estimates the value on the horizontal axis at point C1B as the second rotational position of the zoom ring 213 the after predetermined time T3.

The lens controller 240 finds the position of the focus lens 230 at the first rotational position on the tracking table for the 2.0 m captured object distance, and calculates the position of the focus lens 230 where the captured object distance is greater than this position by the predetermined amount as the first movement target position.

The lens controller 240 also finds the position of the focus lens 230 at the second rotational position on the tracking table for the 2.0 m captured object distance, and calculates the position of the focus lens 230 where the captured object distance is smaller than this position by the predetermined amount as the second movement target position.

The position on the vertical axis at point C1A in FIG. 9 is the "first movement target position," and the position on the vertical axis at point C1B in FIG. 9 is the "second movement target position."

The focus motor 233 moves the focus lens 230 so that it is at the horizontal position of C1A after the predetermined time T2. The focus motor 233 also moves the focus lens 230 so that it is at the horizontal position of C1B after the predetermined time T3.

The CCD image sensor 110 outputs image data based on the captured image that received was received during the predetermined period including when the focus lens 230 is at the first movement target position (C1A position), and the camera controller 140 calculates the sharpness of the image (first sharpness) based on those image data.

The CCD image sensor 110 also outputs image data based on the captured image that was received during the predetermined period including when the focus lens 230 is at the second movement target position (C1B position), and the camera controller 140 calculates the sharpness of the image (second sharpness) based on those image data.

It should be noted that it is sufficient for the "predetermined period" to be a period in which it is possible to obtain sufficient image data for comparing the difference between the first sharpness and the second sharpness.

The camera controller 140 sends the first sharpness and the second sharpness to the lens controller 240.

Next, the procedure is advanced to step S47.

It should be noted that it is also possible for the same operations as those of steps S43 and S44 to be performed during the procedure of step S46, without first estimating all of the focal length after the predetermined time T2 (first focal length), the focal length after the predetermined time T3 (second focal length), or the focal length after the predetermined time T4 (third focal length) based on the rotational position and the rotational speed that were obtained in steps S43 and S44, and then to find the focal lengths (second focal length, third focal length) after the predetermined time based on the rotational position and the rotational speed that are obtained.

It is also possible for the CCD image sensor 110 to output image data based on the captured object image that is received during the period that includes the time at the captured object distance that corresponds to the selected tracking table (when the focus lens 230 is located at the focus lens 230 position that corresponds to that captured object distance), and for the camera controller 140 to calculate the sharpness of the image (third sharpness) based on those image data.

In the example of FIG. 9, the third sharpness is for example obtained at point C1, and/or point C1C.

(Step S47):

Based on information that includes the first sharpness and the second sharpness, a captured object distance at which the sharpness of the image increases is calculated. Specifically, the first sharpness, which is obtained at a captured object distance that is greater than the captured object distance that corresponds to the currently selected tracking table, and a second sharpness, which is obtained at a captured object distance that is smaller than the captured object distance that corresponds to the currently selected tracking table, are compared.

If the first sharpness is larger than the second sharpness, then a captured object distance that is larger than the captured object distance that corresponds to the currently selected tracking table is estimated to be the captured object distance at which the sharpness of the image increases.

On the other hand, if the first sharpness is smaller than the second sharpness, then the captured object distance that is smaller than the captured object distance that corresponds to the currently selected tracking table is estimated to be the captured object distance at which the sharpness of the image increases.

As for the method for estimating the captured object distance at which the sharpness of the image increases, it is possible to assume that a captured object distance at which the image sharpness is an extreme exists between the captured object distance that corresponds to the first sharpness and the captured object distance that corresponds to the second sharpness when the first sharpness and the second sharpness are obtained, and then to calculate the captured object distance at which the sharpness of the image increases based on the captured object distances when the first sharpness and the second sharpness are obtained, and on the first sharpness and the second sharpness, and, from that calculated captured object distance, estimate the captured object distance where the sharpness of the image increases.

The camera controller 140 then selects the tracking table that corresponds to the calculated (estimated) captured object distance.

In the example of FIG. 9, (sharpness at C1B)>(sharpness at C1A).

The captured object distance at which the image sharpness increases can be estimated to be a shorter distance than the 2.0 m captured object distance of the tracking table that is selected at CT. In the example of FIG. 9, the tracking table at a 1.0 m captured object distance, which is shorter than for a 2.0 m captured object distance, is selected.

Next, the procedure is advanced to step S48.

It should be noted that it is also possible to calculate a captured object distance at which the image sharpness increases based on information that also includes the third sharpness that was discussed above, in addition to the first sharpness and the second sharpness, and to set the tracking table based on that calculated captured object distance.

It is also possible for the lens controller 240 to determine only whether the captured object distance at which the image sharpness increases is a larger or a smaller value than the captured object distance that corresponds to the currently selected tracking table based on the first sharpness and the second sharpness, and based on the result of that determination, to select a tracking table that corresponds to a captured object distance that is larger or smaller by a predetermined amount than the captured object distance that corresponds to the currently selected tracking table.

(Step S48):

The lens controller 240 references the tracking table and obtains the position of the focus lens 230 that corresponds to the third focal length that was estimated in step S46 (the focal length after the predetermined time T4). Specifically, the lens controller 240 references the tracking table and obtains the position, in the optical axis AX direction, of the focus lens 230 that corresponds to the third rotational position of the zoom ring 213 (rotational position of the zoom ring 213 after the predetermined time T4), which is obtained in step S46. The lens controller 240 then sends a command to the focus motor 233 to move the focus lens 230 to that position, which serves as the movement target position for the focus lens 230.

In the example of FIG. 9, the value on the vertical axis at C2 is obtained as the movement target position.

Next, the procedure is advanced to step S49.

(Step S49):

The focus motor 233 moves the focus lens 230 to the movement target position.

In the example of FIG. 9 it is moved to the position corresponding to C2.

Next, the procedure is advanced to step S52.

It should be noted that the control mode in which the processing from steps S46 through S49 is performed as described above is an example of the "first control mode" of the camera system 1.

(Step S52):

The lens controller 240 determines whether or not a command to end constant AF has been received. If an end command has not been received, then the procedure is returned to step S43. If an end command has been received, then the lens controller 240 stops constant AF (control in the constant AF mode).

In the example of FIG. 9, the result of the determination in step S45 is always yes, and the camera system 1 repeatedly executes the operations from step S43 to step S49 until constant AF is over.

Thus, with the camera system 1, the focus lens 230 is moved based on the tracking table and the captured object distance is kept substantially constant (a focus state at an appropriate captured object distance can maintained always (kept in focus for a set period of time)), even if the zoom ring 213 is rotationally operated to effect a change in the focal length of the optical system.

Further, with the camera system 1, even if an appropriate tracking table has not been selected, a new tracking table is selected based on the sharpness and thus it is possible to maintain a good focus state.

With the camera system 1, even if there is a change in the distance in the optical axis AX direction between the captured object and the camera system, a new tracking table is selected based on the sharpness and thus it is possible to maintain a good focus state.

In the example of FIG. 9, the focus lens 230 sequentially moves to the positions that correspond to the points C3, C4, C5, C6, and C7, in that order, while performing wobbling.

Constant AF is ended by a command from the camera controller 140. For example, when a setting is made to not activate auto-focus while in live view mode, the camera controller 140 sends a command to end constant AF mode to the lens controller 240. The camera controller 140 also sends a command to end the constant AF mode to the lens controller 240 when ending the moving image capture mode, in which moving images are captured and storing to the memory card 171.

If the zoom ring 213 has not been rotationally operated and there is no change in the focal length of the optical system, then the rotational speed of the zoom ring 213 is calculated as 0 (step S44). Accordingly, the rotational positions of the zoom ring 213 after the predetermined times T2, T3, and T4 are estimated to be the same as the current position, and the first movement target position and the second movement target position of the focus lens 230 based on the tracking table are positions that are in front or behind, by a predetermined amount in the optical axis AX direction, the current position of the focus lens 230 (step S46). Then, the AF operation at an appropriate captured object distance is maintained according to the sharpness. The position to move the focus lens 230 is determined (step S48), and the lens controller 240 moves the focus lens 230 to that target position (step S49). In this way, the camera system 1 maintains a good state of focus.

<<Process for Determining Whether or Not to Perform Wobbling>>

(Detailed Description of Step S45):

As described above, in terms of maintaining a good state of focus, the camera system 1 preferably always performs steps S46 through S49.

The wobbling operation of step S46 requires advancing or retreating in the optical axis direction from the position, in the optical axis direction, of the focus lens 230, based on the tracking table.

However, there is a limitation to the movement speed of the focus lens 230, that is, the driving ability of the focus motor 233, and this may make it difficult to move the focus lens 230 more forward or backward along the optical axis than its position in the optical axis direction based on the tracking table.

For example, in a case where the camera system 1 adopts an operational member such as the zoom ring 213 for determining the focal length according to a position after manipulation by the user, the user can freely operate the operational member and may cause the focal length to change quickly. In this case, in the camera system 1 the amount that the focus lens 230 is to be moved due to the change in focal length, that is, the amount that the focus lens 230 is to be moved based on the tracking table, is large, and it may not be possible to move the focus lens 230 to the first movement target position and the second movement target position at the predetermined time points T2 and T3.

Accordingly, in step S45 the lens controller 240 decides whether to control the focus motor 233 in the first control mode, in which wobbling is perform, or in the second control mode, in which wobbling is not performed, based on how the zoom ring 213 has been operated. This is described below.

<<First Decision Criterion>>

For example, the lens controller 240 determines whether to control the focus motor 233 according to the first control mode, in which wobbling is perform, or in the second control mode, in which wobbling is not performed, based on the information relating to the rate of change in the focal length, which is obtained in step S44, or more specifically, based on the rotational speed of the zoom ring 213.

More specifically, the lens controller 240 decides to perform wobbling if the rotational speed of the zoom ring 213 is at or below a predetermined value, and decides not to perform wobbling if the rotational speed of the zoom ring 213 is greater than the predetermined value.

The "predetermined value" can for example be set to a value that is substantially equal to the maximum value (upper limit value) of the rotational speed of the zoom ring 213 at which wobbling is possible when the zoom ring 213 has been rotated, in the region where the change in the position of the focus lens 230 that accompanies the change in the focal length is greatest for a plurality of tracking tables (in FIG. 9, this corresponds to the section in which the slope of the tracking table curves shown in FIG. 9 is greatest). The "predetermined value" is set in this way because in the camera system 1, wobbling cannot be performed when the zoom ring 213 is rotated at a rotational speed that is equal to or greater than this maximum value (upper limit value) (it is not possible to determine the direction in which to correct the focal length through wobbling).

Hereinafter, this decision criterion will also be referred to as the "first decision criterion."

<<Second Decision Criterion>>

The lens controller 240 also determines whether or not to perform wobbling based on:
(1) the rate of change in the focal length;
(2) the focal length; and
(3) the tracking table;
which are obtained in step S44.

Specifically, it determines whether or not to perform wobbling based on:
(1) the rotational speed that is obtained in step S44;
(2) the rotational position that is obtained in step S43; and
(3) the tracking table.

More specifically, the lens controller 240 calculates the first movement target position and the second movement target position as described above in step S46, and
(A) decides to perform wobbling if it determines that the focus lens 230 "can be moved" to the first movement target position after the predetermined time T2, and that the focus lens 230 "can be moved" to the second movement target position after the predetermined time T3; and
(B) decides not to perform wobbling if it determines that the focus lens 230 "cannot be moved" to the first movement target position after the predetermined time T2, or that the focus lens 230 "cannot be moved" to the second movement target position after the predetermined time T3.

Whether or not the focus lens 230 can be moved to the first movement target position and the second movement target position after the predetermined times T2 and T3, respectively, is determined by comparing the speed that is required to move the focus lens 230 to the first movement target position and the second movement target position after the predetermined times T2 and T3, respectively, and the upper limit for the speed at which the focus lens 230 can be moved by the focus motor 233.

The lens controller 240 decides not to perform wobbling if the speed that is required to move the focus lens 230 is equal to or greater than the upper limit for the speed at which the focus lens 230 can be moved by the focus motor 233.

Conversely, the lens controller 240 decides to perform wobbling if the speed that is required to move the focus lens 230 is less than the upper limit for the speed at which the focus lens 230 can be moved by the focus motor 233.

It should be noted that in the camera system 1, the interchangeable lens 200 stores the information relating to the upper limit for the speed at which the focus lens 230 can be moved in the flash memory 242. The information relating to the upper limit for the speed at which the focus lens 230 can be moved is one type of lens data.

Hereinafter, this decision criterion will also be referred to as the "second decision criterion."

<<Process When it is Determined Not to Perform Wobbling>>

The operation in step S45 when the lens controller 240 determines that wobbling is not to be performed and the procedure is advanced to step S50 is described below.

Figure 10:
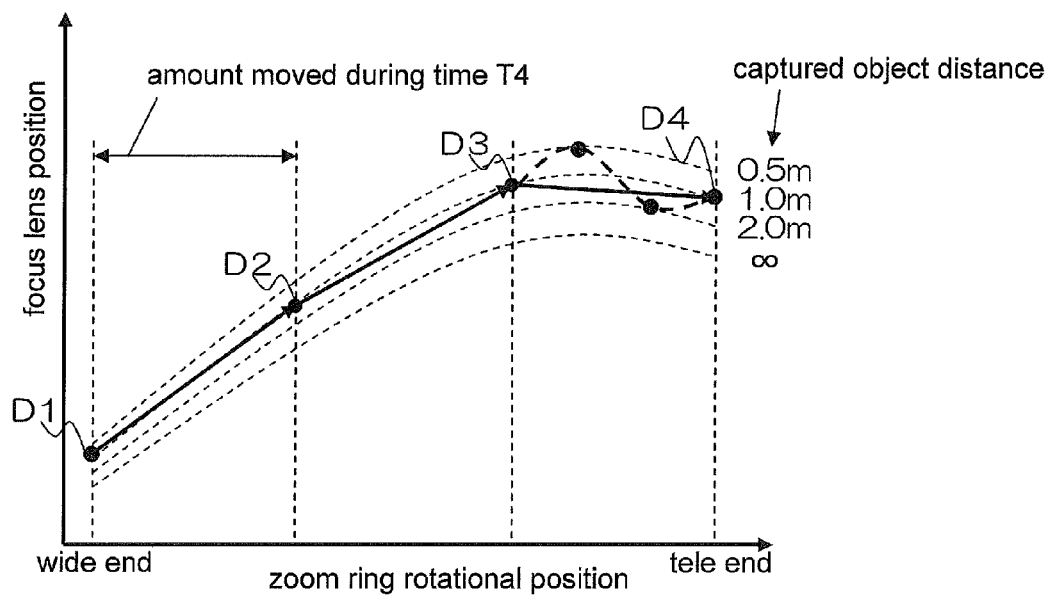
FIG. 10 is a diagram for describing an example of the rotational position of the zoom ring and the movement of the position of the focus lens in the constant AF mode in a case where it is determined in step S45 to not perform wobbling.

FIG. 10 is a diagram for describing an example of the rotational position of the zoom ring and the movement of the focus lens position, in the case where during constant AF it is determined in step S45 to not perform wobbling.

In the example of FIG. 10, in steps S41 through S44 the position of the focus lens 230 corresponding to D1 is obtained, the tracking table for a captured object distance of 1.0 m is selected, and the rotational position of the zoom ring 213 that corresponds to D1 is obtained as the information on the focal length. The rotational speed of the zoom ring 213 also is obtained as the information on the rate of change in the focal length.

In the example of FIG. 10, the zoom ring 213 is rotated at a constant speed, causing the focal length to change at a constant amount.

The vertical dashed lines in FIG. 10 represent the position of the zoom ring 213 at every interval of the predetermined time T4. In the example of FIG. 10, it is determined in step S45 to not perform wobbling, based on the "first decision criterion" for determining whether or not to perform wobbling based on the rotational speed of the zoom ring 213 that is obtained in step S44.

The procedure is then advanced to step S50.

It should be noted that the camera system 1 can also determine whether or not wobbling can be performed with the interchangeable lens 200 only (by the lens controller 240), or for this decision to be made by having the camera controller 140 of the camera body 100 periodically (for example, each frame period) send a wobbling command to the lens controller 240 of the interchangeable lens 200 (that is, to perform polling), and then have the lens controller 240 send a response to this command to the camera controller 140. In this case, when wobbling is possible, the lens controller 240 returns a status of "wobbling possible" to the camera controller 140, and starts the wobbling operation. On the other hand, when wobbling is not possible, the lens controller 240 returns a status of "wobbling not possible" to the camera controller 140, and does not perform the wobbling operation.

(Step S50):

Step S50 is substantially the same operation as step S35. In this embodiment, both the period through step S50 and the period through step S46 are T4.

The lens controller 240 estimates the focal length after the predetermined time T4, based on the information relating to the focal length that is obtained in step S43, and the information relating to the rate of change in the focal length that is obtained in step S44. The lens controller 240 then references the tracking table to obtain the position of the focus lens 230 that corresponds to the estimated focal length.

Specifically, the lens controller 240 estimates the rotational position of the zoom ring 213 after the predetermined time T4 based on the rotational position and the rotational speed of the zoom ring 213 that are obtained in step S43. The lens controller 240 then references the tracking table to obtain the position of the focus lens 230 in the optical axis AX direction that corresponds to the estimated rotational position of the zoom ring 213.

The lens controller 240 then sends a command to the focus motor 233 to move the focus lens 230 to that position, which serves as the movement target position for the focus lens 230.

In the example of FIG. 10, the value on the horizontal axis at D2 is an estimate of the rotational position of the zoom ring 213, and D2 is found on the track table at that value and the value on the vertical axis at D2 is obtained as the movement target position.

Next, the procedure is advanced to step S51.

(Step S51):

Step S51 is substantially the same operation as step S36. The focus motor 233 moves the focus lens 230 to the movement target position.

In the example of FIG. 10, it is moved to the position of D2. The procedure next advances to step S52.

With the camera system 1, the loop returning to step S43 is repeated until it is determined in step S52 that constant AF is over. The processing of step S50 and step S51 is an example of the processing when the control mode is the "second control mode."

In the example of FIG. 10, at D2 and D3 it is determined that wobbling is not to be performed based on the "first decision criterion," in which this determination is made based on the rotational speed of the zoom ring 213, and the focus lens 230 sequentially moves to the positions D2, D3, and D4, in that order, on the tracking table without wobbling (solid arrow in FIG. 10).

The camera system 1 maintains a captured object distance that at least corresponds to the tracking table that has been selected, and a favorable focus state can be maintained.

It should be noted that if the determination of step S45 is made based on the "second decision criterion," which is based on the first movement target position and the second movement target position, then in the example of FIG. 10, it would be determined to perform wobbling at D3 in FIG. 10, and the focus lens 230 would move from D3 to D4 while performing wobbling (dashed curve between D3 and D4 in FIG. 10).

This allows the camera system 1 to obtain a favorable focus state that matches the sharpness.

Thus, the camera system 1 of this embodiment can maintain a good focus state even if the focal length is suddenly changed by the user.

It should be noted that in steps S41 through S52, the processing that is performed by the camera controller 140 and the lens controller 240 is not limited to the processing that has been discussed above, and it is also possible for this processing to be performed on either one of the camera controller 140 and the lens controller 240. In this case, the information that is necessary for the various processes is communicated between the camera controller 140 and the lens controller 240. For example, if the information relating to the upper limit of the movement speed of the focus lens 230 is to be used in step S45, then that information is sent from the lens controller 240 to the camera controller 140. The camera controller 140 and/or the lens controller 240 are examples of the control portion.

Further, with the camera system 1, the period T4 of the wobbling operation generally has a range from 1/30 sec to 1/5 sec. In this embodiment, T4=1/15 sec, T2=1/60 sec, and T3=3/60 sec. It should be noted that this is just one example, and it goes without saying that there is no limitation to these values.

With the camera system 1, the period encompassing step S50 can be shorter than the period encompassing step S46. For example, the period encompassing step S50 can be T2. An example of this case is described in the example of FIG. 11, in which the focal length is changed at the same speed as in the example of FIG. 10.

Figure 11:
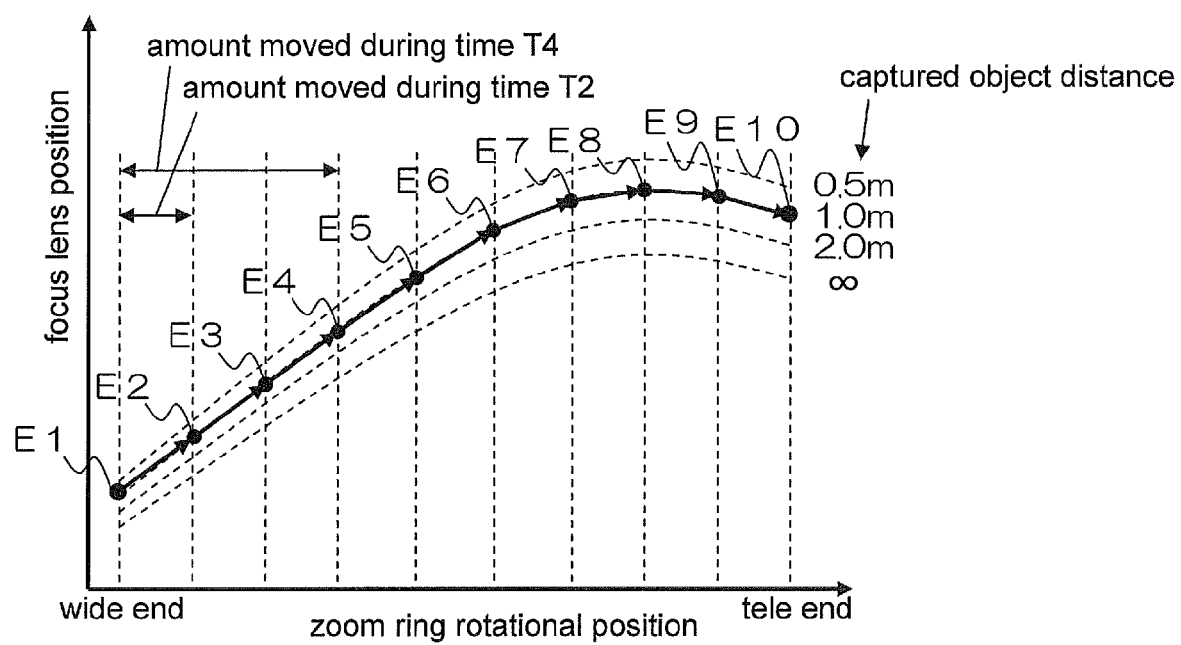
FIG. 11 is a diagram for describing another example of the rotational position of the zoom ring and the movement of the focus lens position in the constant AF mode in a case where it is determined in step S45 that wobbling is to be performed.

In the example of FIG. 11, at each period T2 it is determined in step S45 to not perform wobbling based on the "first decision criterion," and steps S50 and S51 are performed. The focus lens 230 is then moved to the positions corresponding to E1 through E10 in FIG. 11 in that order, without performing wobbling.

Other Embodiments

The preceding discussion pertained to one embodiment. However, the present invention is not limited to this embodiment. Accordingly, other embodiments of the present technology will be described together in this section.

The first embodiment presented a configuration that included an OIS lens 220, but this is not absolutely essential for the present technology. In other words, the present technology can be also be adopted by a camera system that is furnished with an interchangeable lens that does not have a hand-shake correction function.

The first embodiment presented a camera body that is not provided with a movable mirror, but the invention is not limited to this. For example, it is possible to provide a movable mirror within the camera body, or to provide a prism for partitioning the captured image within the camera body. It is also possible to adopt a configuration in which a movable mirror is provided within an adaptor rather than in the camera body.

The position of the focus lens 230 was detected directly in the first embodiment involves. However, it is also possible to detect this indirectly by detecting the angle of rotation of the rotation shaft of the focus motor 233, for example. Thus, with the present technology, the position of the focus lens 230 can be detected directly, or it can be detect indirectly by detecting the position of a mechanism member that moves in concert with the focus lens 230. In other words, ultimately it is only necessary that the position of the focus lens can be specified.

The first embodiment discussed an interchangeable-type camera system, but the present invention is not limited to this. For example, it is also possible for the camera to have an optical system that is fixed to the camera body.

It should be noted that in the camera system described in the foregoing embodiment, the blocks can be independently processed into single chips, or into single chips that include some or all of the blocks, by a semiconductor device such as an LSI.

It should be noted that here this is an LSI, but depending on differences in the degree of integration, it may be referred to as an IC, system LSI, super LSI, or ultra LSI.

The method of circuit integration is not limited to LSI, and it can also be achieved with a dedicated circuit or a generalized processor. After fabrication of the LSI, it is possible to use a programmable FPGA (Field Programmable Gate Array) or a reconfigurable processor in which the connections and settings of the circuit cells within the LSI can be reconfigured.

Further, if other technologies that improve upon or are derived from semiconductor technologies lead to integration technology that supplants LSI, then of course it is also possible to integrate the functional blocks using that technology. Biotechnology applications are one possibility.

The various processes of the foregoing embodiment can be achieved by hardware or software. They also can be achieved by a processing mixture of hardware and software.

It should be noted that the specific configuration of the invention is not limited to the embodiments discussed above, and various modifications and revisions are possible within a scope that does not deviate from the gist of the invention.

In the first embodiment, the drive mechanism 211 drives the zoom lens 210 by mechanically transferring zooming to the zoom lens 210. However, it is also possible for the drive mechanism 211 to transfer the drive force that is generated by an actuator or the like by electrical power, based on the zoom operation, to the zoom lens 210 so as to drive the zoom lens 210.

(Summary of the Embodiments)

Characteristic features of the foregoing embodiments are listed below.

A first aspect is a camera system that is provided with a focus lens, a focus lens drive portion, a focus lens position detection portion, a zoom lens, a zoom lens drive portion, a zoom lens position detection portion, a zooming portion, an imaging portion, an estimated value calculation portion, a tracking table memory portion, and a control portion.

The focus lens is a lens or a lens group that changes the state of focus of an optical image of a captured object by advancing and retreating in the optical axis direction. The focus lens drive portion is for driving the focus lens. The focus lens position detection portion is for detecting the position of the focus lens or a mechanism member that is linked to the focus lens. The zoom lens is a lens or a lens group for changing the focal length of the optical image of the captured object by advancing and retreating in the optical axis direction. The zoom lens drive portion is for driving the zoom lens. The zoom lens position detection portion is for detecting the position of the zoom lens or a mechanism member that is linked to the zoom lens. The zooming portion is an operation portion for effecting driving of the zoom lens. The imaging portion receives the optical image and creates image data. The estimated value calculation portion is for calculating an estimated value for auto focusing, based on the image data that are created by the imaging portion. The tracking table memory portion stores a tracking table that tabulates the relationship between focal lengths that are determined every captured object distance and the position of the focus lens in the optical axis direction. The control portion determines whether to control the focus lens drive portion in a first control mode or a second control mode, based on the information relating to the rate of change in the focal length, and controls the focus lens drive portion based on the control mode that it determines.

If the control portion determines that control is to be performed in the first control mode, then the focus lens drive portion drives the focus lens forward and backward in the optical axis direction so as to change the captured object distance, in accordance with a command from the drive portion, and the estimated value calculation portion calculates estimated values for auto focusing at a plurality of positions at which the focus lens is located when being driven forward and backward in the optical axis direction. The control portion then controls the focus lens drive portion so that it drives the focus lens in a direction that brings the captured object into focus based on the estimated values for auto focusing at the plurality of positions that were calculated by the estimated value calculation portion.

If the control portion determines that control is to be performed in the second control mode, then it controls the focus lens drive portion based on the tracking table.

This camera system allows for switching between a first control mode and a second control mode for performing control. The first control mode is a mode in which focus control is performed through a wobbling operation, for example, and thus the camera system allows focus control to be appropriately executed through wobbling in a case where the control portion has determined that wobbling is possible. On the other hand, focus control can be executed based on a tracking table if the control portion has determined that wobbling is not possible.

Thus, with this camera system, it is possible to perform appropriate AF control regardless of how the zooming portion (for example, the zoom ring) is operated (for example, regardless of the rotational speed of the zoom ring). Consequently, this camera system permits a good state of focus to be maintained regardless of the speed at which varied proportion zooming is carried out.

It should be noted that this camera system is even more effective when used for a camera system where the focal length is determined according to the position after the zooming portion has been operated. This is because the user can freely change the speed of varied proportion zooming by freely operating the zooming portion. In other words, with this camera system, focus control is executed appropriately regardless of how the user performs varied proportion zooming (the zoom operation).

It should be noted that the "captured object distance" refers to the distance from the object that is being focused on the CCD image sensor to the camera, and is a concept that includes the object point distance and the conjugate distance (distance between images). The conjugate distance (distance between images) refers to the distance between the object and its image about the lens.

A second aspect is the first aspect, in which the control portion determines that control is to be performed in the first control mode in a case where the rate of change in the focal length due to the zoom lens advancing or retreating over the optical axis is equal to or less than a predetermined value, and determines that control is to be performed in the second control mode in a case where the rate of change in the focal length due to the zoom lens advancing or retreating over the optical axis is greater than a predetermined value.

A third aspect is the second aspect, in which the predetermined value is a value that is substantially equal to an upper limit value for the speed at which the focal length can be changed by the focus lens drive portion in the first control mode, even when there is a focal length change in the section of the tracking table where the focus lens position is changed by the largest amount in order to keep a constant captured object distance as the focal length changes.

Thus, the camera system allows focus control to be performed in the first control mode until reaching a state that corresponds to the upper limit value for the speed at which the focal length can be changed.

A fourth aspect is the second aspect, in which the predetermined value is a value that is equal to a rate of change in the focal length with which the control portion can determine the direction on the optical axis for bringing the captured object into focus by having the focus lens drive portion drive the focus lens in the first control mode, even if the focal length changes due to advancing or retreating the zoom lens over the optical axis, in a case where the slope K is greatest on a tracking table characteristic curve that is determined by a tracking table where (slope K)=(amount of change in the position of the focus lens in the optical axis direction)/(amount of change in the focal length determined for each captured object distance).

Thus, with the camera system, it is possible to execute focus control in the first control mode until reaching a state that corresponds to the upper limit value for the speed at which the focal length can be changed.

It should be noted that the "slope K" can also be the found by the rate of change (derivative) of the "position of the focus lens in the optical axis direction" with respect to the "focal length determined for each captured object distance," or can be found by taking a derivative (including the differential)

from the data that make up the tracking table characteristic curve that is defined by the tracking table (the data may also take on discrete values).

A fifth aspect is the first aspect, in which the control portion determines whether to control the focus lens drive portion in the first control mode or the second control mode based on the rate of change in the focal length, the focal length, and the tracking table.

A sixth aspect is the fifth aspect, in which the control portion calculates a position of the focus lens in the optical axis direction at which the captured object distance is larger by a predetermined amount after a first predetermined time as a first movement target position, and calculates a position of the focus lens in the optical axis direction at which the captured object distance is smaller by a predetermined amount after a second predetermined time as a second movement target position. Further, the control portion determines that control is to be performed in the second control mode if it determines that the focus lens cannot be moved to the first movement target position after the first predetermined time, or if it determines that the focus lens cannot be moved to the second movement target position after the second predetermined time.

A seventh aspect is the sixth aspect, in which the control portion determines whether or not the focus lens can be moved to the first movement target position after the first predetermined time by comparing the speed that is necessary to move the focus lens to the first movement target position after the first predetermined time, and the upper limit value for the speed at which the zoom lens can move.

An eighth aspect is the sixth or the seventh aspect, in which the control portion determines whether or not the focus lens can be moved to the second movement target position after the second predetermined time by comparing the speed that is necessary to move the focus lens to the second movement target position after the second predetermined time, and the upper limit value for the speed at which the zoom lens can move.

A ninth aspect is any one of the first through eighth aspects, in which the information relating to the rate of change in the focal length is the movement speed of the zoom lens or the movement speed of a mechanism member that is linked to the zoom lens.

A tenth aspect is any one of the first through eighth aspects, in which the focal length is determined according to the position of the zooming portion after it has been operated.

An eleventh aspect is the tenth aspect, in which the information relating to the rate of change in the focal length is the movement speed of the zooming portion.

It should be noted that the "movement speed of the zooming portion" is for example the rotational speed of a rotational ring, if the zooming portion is a rotational ring.

Further, the "information relating to the rate of change in the focal length" is a concept that includes information (data) that is calculated from the movement speed of the zooming portion.

A twelfth aspect is any one of the first through eleventh aspects, in which the focus lens drive portion can drive the focus lens independently from the driving of the zoom lens by the zoom lens drive portion.

A 13th aspect is any one of the first through twelfth aspects, further including a memory portion for storing predetermined data, in which the control portion performs control to create moving image data based on a plurality of image data created by the imaging portion, and stores the moving image data that are created in a memory portion that is fixed to the camera system itself or in a memory portion that can be attached to and detached from the camera system.

An even greater effect is achieved when this camera system is used for a camera system in which a control portion performs control to create moving image data based on a plurality of image data from the imaging portion, and to store the moving image data to a memory portion that is fastened to the camera system or to a memory portion that can be detached from the camera system. This is because it is preferable that the moving image data that are stored in the memory portion are always kept in a good state of focus.

A 14th aspect is a camera system that is provided with a camera body and an interchangeable lens unit that can be detached from the camera body.

The interchangeable lens unit is provided with a focus lens, a focus lens drive portion, a focus lens position detection portion, a zoom lens, a zoom lens drive portion, a zoom lens position detection portion, a zooming portion, a tracking table memory portion, and a control portion.

The camera body is provided with an imaging portion and an estimated value calculation portion.

The focus lens is a lens or a lens group that changes the state of focus of an optical image of a captured object by advancing and retreating in the optical axis direction. The focus lens drive portion is for driving the focus lens. The focus lens position detection portion is for detecting the position of the focus lens or a mechanism member that is linked to the focus lens. The zoom lens changes the focal length of the optical image of the captured object by advancing and retreating in the optical axis direction. The zoom lens drive portion is for driving the zoom lens. The zoom lens position detection portion is for detecting the position of the zoom lens or a mechanism member that is linked to the zoom lens. The zooming portion is an operation portion for effecting driving of the zoom lens. The tracking table memory portion stores a tracking table that tabulates the relationship between focal lengths that are determined every captured object distance and the position of the focus lens in the optical axis direction. The control portion determines whether to control the focus lens drive portion in a first control mode or a second control mode, based on the information relating to the rate of change in the focal length, and controls the focus lens drive portion based on the control mode that it determines.

The imaging portion receives the optical image and creates image data. The estimated value calculation portion is for calculating an estimated value for auto focusing, based on the image data that are created by the imaging portion.

If the control portion determines that control is to be performed in the first control mode, then, in accordance with a command from the drive portion, the focus lens drive portion drives the focus lens forward and backward in the optical axis direction, so as to change the captured object distance. The estimated value calculation portion calculates estimated values for auto focusing for a plurality of positions at which the focus lens is located when it is driven forward and backward in the optical axis direction. The control portion then controls the focus lens drive portion so that it drives the focus lens in a direction that brings the captured object into focus, based on the estimated values for auto focusing at a plurality of positions that were calculated by the estimated value calculation portion. If the control portion determines that control is to be performed in the second control mode, then the control portion controls the focus lens drive portion based on the tracking table.

Thus, with a camera body and an interchangeable lens unit that is detachable from the camera body, it is possible to achieve a camera system that exhibits the same effects as in the first aspect.

A 15th aspect is a camera system that is provided with a camera body and an interchangeable lens unit that can be detached from the camera body.

The interchangeable lens unit is provided with a focus lens, a focus lens drive portion, a focus lens position detection portion, a zoom lens, a zoom lens drive portion, a zoom lens position detection portion, a zooming portion, and a tracking table memory portion.

The camera body is provided with an imaging portion, an estimated value calculation portion, and a control portion.

The focus lens is a lens or a lens group that changes the state of focus of an optical image of a captured object by advancing and retreating in the optical axis direction. The focus lens drive portion is for driving the focus lens. The focus lens position detection portion is for detecting the position of the focus lens or a mechanism member that is linked to the focus lens. The zoom lens changes the focal length of the optical image of the captured object by advancing and retreating in the optical axis direction. The zoom lens drive portion is for driving the zoom lens. The zoom lens position detection portion is for detecting the position of the zoom lens or a mechanism member that is linked to the zoom lens. The zooming portion is for effecting driving of the zoom lens. The tracking table memory portion stores a tracking table that tabulates the relationship between focal lengths that are determined every captured object distance and the position of the focus lens in the optical axis direction. The control portion determines whether to control the focus lens drive portion in a first control mode or a second control mode, based on the information relating to the rate of change in the focal length, and controls the focus lens drive portion based on the control mode that it determines.

The imaging portion receives the optical image and creates image data. The estimated value calculation portion is for calculating an estimated value for auto focusing, based on the image data that are created by the imaging portion.

If the control portion determines that control is to be performed in the first control mode, then, in accordance with a command from the drive portion, the focus lens drive portion drives the focus lens forward and backward in the optical axis direction so as to change the captured object distance. The estimated value calculation portion calculates estimated values for auto focusing for a plurality of positions at which the focus lens is located when it is driven forward and backward in the optical axis direction. The control portion then controls the focus lens drive portion so that it drives the focus lens in a direction that brings the captured object into focus, based on the estimated values for auto focusing at a plurality of positions that were calculated by the estimated value calculation portion. If the control portion determines that control is to be performed in the second control mode, then the control portion controls the focus lens drive portion based on the tracking table.

Thus, with a camera body and an interchangeable lens unit that is detachable from the camera body, it is possible to achieve a camera system that exhibits the same effects as those of the first aspect.

A 16th aspect is an interchangeable lens unit that can be detached from a camera body that is provided with an image portion and an estimated value calculation portion, and the two together make up a camera system.

The interchangeable lens unit is provided with a focus lens, a focus lens drive portion, a focus lens position detection portion, a zoom lens, a zoom lens drive portion, a zoom lens position detection portion, a zooming portion, a tracking table memory portion, and a control portion.

The focus lens is a lens or a lens group that changes the state of focus of an optical image of a captured object by advancing and retreating in the optical axis direction. The focus lens drive portion is for driving the focus lens. The focus lens position detection portion is for detecting the position of the focus lens or a mechanism member that is linked to the focus lens. The zoom lens changes the focal length of the optical image of the captured object by advancing and retreating in the optical axis direction. The zoom lens drive portion is for driving the zoom lens. The zoom lens position detection portion is for detecting the position of the zoom lens or a mechanism member that is linked to the zoom lens. The zooming portion is for effecting driving of the zoom lens. The tracking table memory portion stores a tracking table that tabulates the relationship between focal lengths that are determined every captured object distance and the position of the focus lens in the optical axis direction. The control portion determines whether to control the focus lens drive portion in a first control mode or a second control mode, based on the information relating to the rate of change in the focal length, and controls the focus lens drive portion based on the control mode that it determines.

The imaging portion receives the optical image and creates image data. The estimated value calculation portion is for calculating an estimated value for auto focusing, based on the image data that are created by the imaging portion.

If the control portion determines that control is to be performed in the first control mode, then, in accordance with a command from the drive portion, the focus lens drive portion drives the focus lens forward and backward in the optical axis direction so as to change the captured object distance. The estimated value calculation portion calculates estimated values for auto focusing for a plurality of positions at which the focus lens is located when it is driven forward and backward in the optical axis direction. The control portion then controls the focus lens drive portion so that it drives the focus lens in a direction that brings the captured object into focus, based on the estimated values for auto focusing at a plurality of positions that were calculated by the estimated value calculation portion. If the control portion determines that control is to be performed in the second control mode, then the control portion controls the focus lens drive portion based on the tracking table.

Thus, it is possible to achieve an interchangeable lens unit that is detachable from the camera body, and that together with the camera body form a camera system that exhibits the same effects as those of the first aspect.

A 17th aspect is an interchangeable lens unit that constitutes the camera system according to the 15th aspect.

Thus, it is possible to achieve an interchangeable lens unit that is detachable from the camera body, and that together with the camera body form a camera system that exhibits the same effects as those of the first aspect.

An 18th aspect is a focus control method that is used in a camera system provided with a focus lens, a focus lens drive portion, a focus lens position detection portion, a zoom lens, a zoom lens drive portion, a zoom lens position detection portion, a zooming portion, an imaging portion, and a tracking table memory portion. The focus control method includes an estimated value calculation step and a control step.

The focus lens changes the state of focus of an optical image of a captured object by advancing and retreating in the optical axis direction. The focus lens drive portion is a lens or lens group for driving the focus lens. The focus lens position detection portion is for detecting the position of the focus lens or a mechanism member that is linked to the focus lens. The zoom lens is a lens or a lens group that changes the focal length of the optical image of the captured object by advancing and retreating in the optical axis direction. The zoom lens drive portion is for driving the zoom lens. The zoom lens position detection portion is for detecting the position of the zoom lens or a mechanism member that is linked to the zoom lens. The zooming portion is for effecting driving of the zoom lens. The imaging portion receives the optical image and creates image data. The tracking table memory portion stores a tracking table that tabulates the relationship between focal lengths that are determined every captured object distance and the position of the focus lens in the optical axis direction.

In the estimated value calculation step, an estimated value for auto focusing is calculated based on the image data that are created by the imaging portion.

In the control step, it is determined whether to control the focus lens drive portion in a first control mode or a second control mode, based on the information relating to the rate of change in the focal length, and the focus lens drive portion is controlled based on the control mode that is determined.

If in the control step it is determined that control is to be performed in the first control mode, and, in accordance with a command from the drive portion, the focus lens drive portion drives the focus lens forward and backward in the optical axis direction so as to change the captured object distance, then, in the estimated value calculation step, estimated values for auto focusing at a plurality of positions at which the focus lens is located when it is being driven forward and backward in the optical axis direction are calculated. Then, in the control step, the focus lens drive portion is controlled so that it drives the focus lens in a direction that brings the captured object into focus, based on the estimated values for auto focusing for the plurality of positions that were calculated in the estimated value calculation step. If in the control step it is determined that control is to be performed in the second control mode, then in the control step the focus lens drive portion is controlled based on the tracking table.

A 19th aspect is a program for causing a computer to execute a focus control method that is used in a camera system provided with a focus lens, a focus lens drive portion, a focus lens position detection portion, a zoom lens, a zoom lens drive portion, a zoom lens position detection portion, a zooming portion, an imaging portion, and a tracking table memory portion. The focus control method includes an estimated value calculation step and a control step.

The focus lens changes the state of focus of an optical image of a captured object by advancing and retreating in the optical axis direction. The focus lens drive portion is a lens or lens group for driving the focus lens. The focus lens position detection portion is for detecting the position of the focus lens or a mechanism member that is linked to the focus lens. The zoom lens is a lens or a lens group that changes the focal length of the optical image of the captured object by advancing and retreating in the optical axis direction. The zoom lens drive portion is for driving the zoom lens. The zoom lens position detection portion is for detecting the position of the zoom lens or a mechanism member that is linked to the zoom lens. The zooming portion is for effecting driving of the zoom lens. The imaging portion receives the optical image and creates image data. The tracking table memory portion stores a tracking table that tabulates the relationship between focal lengths that are determined every captured object distance and the position of the focus lens in the optical axis direction.

In the estimated value calculation step, an estimated value for auto focusing is calculated based on the image data that are created by the imaging portion.

In the control step, it is determined whether to control the focus lens drive portion in a first control mode or a second control mode, based on the information relating to the rate of change in the focal length, and the focus lens drive portion is controlled based on the control mode that is determined.

If in the control step it is determined that control is to be performed in the first control mode, and, in accordance with a command from the drive portion, the focus lens drive portion drives the focus lens forward and backward in the optical axis direction so as to change the captured object distance, then in the estimated value calculation step, estimated values for auto focusing at a plurality of positions at which the focus lens is located when it is being driven forward and backward in the optical axis direction are calculated. Then, in the control step, the focus lens drive portion is controlled so that it drives the focus lens in a direction that brings the captured object into focus, based on the estimated values for auto focusing for the plurality of positions that were calculated in the estimated value calculation step, and if in the control step it is determined that control is to be performed in the second control mode, then in the control step the focus lens drive portion is controlled based on the tracking table.

With this technology, it is possible to achieve a camera unit, an interchangeable lens unit, a focus control method, and a program, with which a good state of focus can be maintained regardless of the speed of zooming during varied proportion zooming.

The camera system, camera unit, interchangeable lens unit, focus control method, and program according to the invention allow for appropriate focus control to be performed regardless of the speed of varied proportion zooming, and thus they can be adopted in devices relating to video. Specifically, they can be adopted by digital still cameras and movie cameras, for example, and they are useful in the field of devices related to video and can be implemented in that field.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A camera system comprising:
  a focus lens that advances and retreats in an optical axis direction to change a state of focus of an optical image of a captured object;
  a focus lens drive portion for driving the focus lens;
  a focus lens position detection portion for detecting a position of the focus lens, or a mechanism member that is linked to the focus lens;
  a zoom lens that advances and retreats in the optical axis direction to change a focal length of the optical image of the captured object;
  a zoom lens drive portion for driving the zoom lens;
  a zoom lens position detection portion for detecting the position of the zoom lens, or a mechanism member that is linked to the zoom lens;
  a zooming portion for effecting driving of the zoom lens;

an imaging portion that receives the optical image and creates image data;

an estimated value calculation portion for calculating an estimated value for auto focusing, based on the image data that are created by the imaging portion;

a tracking table memory portion for storing a tracking table that tabulates a relationship between focal lengths that are determined every captured object distance and the position of the focus lens in the optical axis direction; and a control portion that determines whether to control the focus lens drive portion in a first control mode or a second control mode, based on information relating to the rate of change in the focal length, and controls the focus lens drive portion based on the control mode that is determined;

wherein in a case where the control portion determines that control is to be performed in the first control mode, the focus lens drive portion drives the focus lens forward and backward in the optical axis direction, in accordance with a command from the drive portion, so as to change the captured object distance;

the estimated value calculation portion calculates estimated values for auto focusing at a plurality of positions at which the focus lens is located when it is being driven forward and backward in the optical axis direction; and the control portion controls the focus lens drive portion so that it drives the focus lens in a direction that brings the captured object into focus, based on the estimated values for auto focusing at the plurality of positions that were calculated by the estimated value calculation portion; and wherein in a case where the control portion determines that control is to be performed in the second control mode, the control portion controls the focus lens drive portion based on the tracking table.

2. A camera system according to claim 1,
wherein the control portion determines that control is to be performed in the first control mode in a case where the rate of change in the focal length due to the zoom lens advancing or retreating over the optical axis is equal to or less than a predetermined value, and
determines that control is to be performed in the second control mode in a case where the rate of change in the focal length due to the zoom lens advancing or retreating over the optical axis is greater than the predetermined value.

3. A camera system according to claim 2,
wherein the predetermined value is a value that is substantially equal to an upper limit value for the speed at which the focal length can be changed by the focus lens drive portion in the first control mode, even when there is a change in the focal length, in the section of the tracking table where the focus lens position changes by the greatest amount in order to keep a constant captured object distance as the focal length changes.

4. A camera system according to claim 2,
wherein the predetermined value is a value that is equal to a rate of change in the focal length with which the control portion can determine the direction on the optical axis for bringing the captured object into focus by having the focus lens drive portion drive the focus lens in the first control mode, even if the focal length changes due to advancing or retreating the zoom lens over the optical axis,
in a case where a slope K is greatest on a tracking table characteristic curve that is determined by the tracking table,
wherein
(slope K) =(amount of change in the position of the focus lens in the optical axis direction)/(amount of change in the focal length determined for each captured object distance).

5. A camera system according to claim 1,
wherein the control portion obtains, from the rate of change in the focal length, the focal lenth, and the tracking table,
(i) a required speed to move the focus lens to a first movement target position and a second movement target position after predetermined times T1 and T2, respectively, and (ii) an upper limit for the speed at which the focus lens can be moved by the focus lens drive portion, and
(1) if the required speed to move the focus lens is less than the upper limit for the speed at which the focus lens can be moved by the focus drive portion, the control portion determines to control the focus lens drive portion in the first control mode, and
(2) if the require speed to move the focus lens is equal to or greater than the upper limit for the speed at which the focus lens can be moved by the focus lens drive portion, the control portion determines to control the focus lens drive portion in the second control mode.

6. A camera system according to claim 1,
wherein the control portion calculates a position of the focus lens in the optical axis direction at which the captured object distance is larger by a predetermined amount after a first predetermined time, as a first movement target position; and
calculates a position of the focus lens in the optical axis direction at which the captured object distance is smaller by a predetermined amount after a second predetermined time, as a second movement target position;
wherein the control portion determines that control is to be performed in the second control mode in a case where it determines that the focus lens cannot be moved to the first movement target position after the first predetermined time, or in a case where it determines that the focus lens cannot be moved to the second movement target position after the second predetermined time.

7. A camera system according to claim 6,
wherein the control portion determines whether or not the focus lens can be moved to the first movement target position after the first predetermined time by comparing the speed that is necessary to move the focus lens to the first movement target position after the first predetermined time, and the upper limit value for the speed at which the focus lens can be moved.

8. A camera system according to claim 6,
wherein the control portion determines whether or not the focus lens can be moved to the second movement target position after the second predetermined time by comparing the speed that is necessary to move the focus lens to the second movement target position after the second predetermined time, and the upper limit value for the speed at which the focus lens can move.

9. A camera system according to claim 1,
wherein the information relating to the rate of change in the focal length is the movement speed of the zoom lens or the movement speed of a mechanism member that is linked to the zoom lens.

10. A camera system according to claim 1,
wherein the focal length is determined according to the position of the zooming portion after the zooming portion has been operated.

11. A camera system according to claim 10,
wherein the information relating to the rate of change in the focal length is the movement speed of the zooming portion.

12. A camera system according to claim 1,
wherein the focus lens drive portion can drive the focus lens independently from the driving of the zoom lens by the zoom lens drive portion.

13. A camera system according to claim 1, further comprising:
a memory portion for storing predetermined data;
wherein the control portion performs control to create moving image data based on a plurality of image data created by the imaging portion, and stores the moving image data that are created in a memory portion that is fixed to the camera system itself or in a memory portion that can be attached to and detached from the camera system.

14. A camera system comprising a camera body and an interchangeable lens unit that can be detached from the camera body;
wherein the interchangeable lens unit comprises:
a focus lens for changing a state of focus of an optical image of a captured object by advancing and retreating in an optical axis direction,
a focus lens drive portion for driving the focus lens;
a focus lens position detection portion for detecting the position of the focus lens or a mechanism member that is linked to the focus lens;
a zoom lens for changing the focal length of the optical image of the captured object by advancing and retreating in the optical axis direction;
a zoom lens drive portion for driving the zoom lens;
a zoom lens position detection portion for detecting the position of the zoom lens or a mechanism member that is linked to the zoom lens;
a zooming portion for effecting driving of the zoom lens;
a tracking table memory portion for storing a tracking table that tabulates the relationship between focal lengths that are determined every captured object distance and the position of the focus lens in the optical axis direction; and
a control portion that determines whether to control the focus lens drive portion in a first control mode or a second control mode, based on the information relating to the rate of change in the focal length, and controls the focus lens drive portion based on the control mode that is determined;
wherein the camera body comprises:
an imaging portion that receives the optical image and creates image data; and
an estimated value calculation portion for calculating an estimated value for auto focusing, based on the image data that are created by the imaging portion;
wherein in a case where the control portion determines that control is to be performed in the first control mode, then
the focus lens drive portion, in accordance with a command from the drive portion, drives the focus lens forward and backward in the optical axis direction so as to change the captured object distance;
the estimated value calculation portion calculates estimated values for auto focusing for a plurality of positions at which the focus lens is located when it is driven forward and backward in the optical axis direction; and
the control portion controls the focus lens drive portion so that it drives the focus lens in a direction that brings the captured object into focus, based on the estimated values for auto focusing at a plurality of positions that were calculated by the estimated value calculation portion; and
wherein in a case where the control portion determines that control is to be performed in the second control mode, then
the control portion controls the focus lens drive portion based on the tracking table.

15. A camera system comprising a camera body and an interchangeable lens unit that can be detached from the camera body;
wherein the interchangeable lens unit comprises:
a focus lens for changing a state of focus of an optical image of a captured object by advancing and retreating in an optical axis direction,
a focus lens drive portion for driving the focus lens;
a focus lens position detection portion for detecting the position of the focus lens or a mechanism member that is linked to the focus lens;
a zoom lens for changing the focal length of the optical image of the captured object by advancing and retreating in the optical axis direction;
a zoom lens drive portion for driving the zoom lens;
a zoom lens position detection portion for detecting the position of the zoom lens or a mechanism member that is linked to the zoom lens;
a zooming portion for effecting driving of the zoom lens; and
a tracking table memory portion for storing a tracking table that tabulates the relationship between focal lengths that are determined every captured object distance and the position of the focus lens in the optical axis direction;
wherein the camera body comprises:
an imaging portion that receives the optical image and creates image data;
an estimated value calculation portion for calculating an estimated value for auto focusing, based on the image data that are created by the imaging portion; and
a control portion that determines whether to control the focus lens drive portion in a first control mode or a second control mode, based on the information relating to the rate of change in the focal length, and controls the focus lens drive portion based on the control mode that is determined;
wherein in a case where the control portion determines that control is to be performed in the first control mode, then
the focus lens drive portion, in accordance with a command from the drive portion, drives the focus lens forward and backward in the optical axis direction so as to change the captured object distance;
the estimated value calculation portion calculates estimated values for auto focusing for a plurality of positions at which the focus lens is located when it is driven forward and backward in the optical axis direction; and
the control portion controls the focus lens drive portion so that it drives the focus lens in a direction that brings the captured object into focus, based on the estimated values for auto focusing at a plurality of positions that were calculated by the estimated value calculation portion; and wherein in a case where the control portion determines that control is to be performed in the second control mode, then the control portion controls the focus lens drive portion based on the tracking table.

16. An interchangeable lens unit that can be detached from a camera body, the camera body comprising an imaging portion that receives the optical image and creates image data, and an estimated value calculation portion for calculating an estimated value for auto focusing, based on the image data that are created by the imaging portion, wherein the interchangeable lens unit and the camera body together constitute a camera system;

wherein the interchangeable lens unit comprises:

a focus lens for changing a state of focus of an optical image of a captured object by advancing and retreating in an optical axis direction, a focus lens drive portion for driving the focus lens;

a focus lens position detection portion for detecting the position of the focus lens or a mechanism member that is linked to the focus lens;

a zoom lens for changing the focal length of the optical image of the captured object by advancing and retreating in the optical axis direction;

a zoom lens drive portion for driving the zoom lens;

a zoom lens position detection portion for detecting the position of the zoom lens or a mechanism member that is linked to the zoom lens;

a zooming portion for effecting driving of the zoom lens;

a tracking table memory portion for storing a tracking table that tabulates the relationship between focal lengths that are determined every captured object distance and the position of the focus lens in the optical axis direction; and a control portion that determines whether to control the focus lens drive portion in a first control mode or a second control mode, based on the information relating to the rate of change in the focal length, and controls the focus lens drive portion based on the control mode that is determined;

wherein in a case where the control portion determines that control is to be performed in the first control mode, then the focus lens drive portion, in accordance with a command from the drive portion, drives the focus lens forward and backward in the optical axis direction so as to change the captured object distance;

the estimated value calculation portion calculates estimated values for auto focusing for a plurality of positions at which the focus lens is located when it is driven forward and backward in the optical axis direction; and the control portion controls the focus lens drive portion so that it drives the focus lens in a direction that brings the captured object into focus, based on the estimated values for auto focusing at a plurality of positions that were calculated by the estimated value calculation portion; and wherein in a case where the control portion determines that control is to be performed in the second control mode, then the control portion controls the focus lens drive portion based on the tracking table.

17. A focus control method that is used in a camera system comprising:

a focus lens for changing a state of focus of an optical image of a captured object by advancing and retreating in an optical axis direction, a focus lens drive portion for driving the focus lens;

a focus lens position detection portion for detecting the position of the focus lens or a mechanism member that is linked to the focus lens;

a zoom lens for changing the focal length of the optical image of the captured object by advancing and retreating in the optical axis direction;

a zoom lens drive portion for driving the zoom lens;

a zoom lens position detection portion for detecting the position of the zoom lens or a mechanism member that is linked to the zoom lens;

a zooming portion for effecting driving of the zoom lens;

an imaging portion that receives the optical image and creates image data; and a tracking table memory portion for storing a tracking table that tabulates the relationship between focal lengths that are determined every captured object distance and the position of the focus lens in the optical axis direction;

wherein the focus control method comprises:

calculating an estimated value for auto focusing based on the image data that are created by the imaging portion; and determining whether to control the focus lens drive portion in a first control mode or a second control mode, based on the information relating to the rate of change in the focal length, and controlling the focus lens drive portion based on the control mode that is determined;

wherein in a case where in the control step it is determined that control is to be performed in the first control mode, and the focus lens drive portion, in accordance with a command from the drive portion, drives the focus lens forward and backward in the optical axis direction so as to change the captured object distance, then in the estimated value calculation step, estimated values for auto focusing at a plurality of positions at which the focus lens is located when it is being driven forward and backward in the optical axis direction are calculated; and in the control step, the focus lens drive portion is controlled so that it drives the focus lens in a direction that brings the captured object into focus, based on the estimated values for auto focusing at a plurality of positions that were calculated in the estimated value calculation step; and wherein in a case where in the control step it is determined that control is to be performed in the second control mode, then in the control step the focus lens drive portion is controlled based on the tracking table.

* * * * *